United States Patent
Lee et al.

(10) Patent No.: US 10,997,236 B2
(45) Date of Patent: May 4, 2021

(54) AUDIO CONTENT RECOGNITION METHOD AND DEVICE

(71) Applicant: SAMSUNG ELECTRONICS CO., LTD., Suwon-si (KR)

(72) Inventors: Sang-moon Lee, Seongnam-si (KR); In-woo Hwang, Suwon-si (KR); Byeong-seob Ko, Suwon-si (KR); Ki-beom Kim, Yongin-si (KR); Young-tae Kim, Seongnam-si (KR); Anant Baijal, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 15/560,779

(22) PCT Filed: Apr. 27, 2016

(86) PCT No.: PCT/KR2016/004428
§ 371 (c)(1),
(2) Date: Sep. 22, 2017

(87) PCT Pub. No.: WO2016/175564
PCT Pub. Date: Nov. 3, 2016

(65) Prior Publication Data
US 2018/0060428 A1 Mar. 1, 2018

Related U.S. Application Data

(60) Provisional application No. 62/153,102, filed on Apr. 27, 2015.

(51) Int. Cl.
*G06F 16/00* (2019.01)
*G06F 16/683* (2019.01)
(Continued)

(52) U.S. Cl.
CPC ............ *G06F 16/683* (2019.01); *G06F 16/61* (2019.01); *G10L 19/02* (2013.01); *G10L 25/03* (2013.01); *G10L 25/54* (2013.01); *G10L 25/45* (2013.01)

(58) Field of Classification Search
None
See application file for complete search history.

(56) References Cited

U.S. PATENT DOCUMENTS 6,990,453 B2  1/2006  Wang et al.
7,818,167 B2  10/2010  Kim et al.
(Continued)

FOREIGN PATENT DOCUMENTS

KR    10-0774585 B1    11/2007
KR    10-2009-0014754 A    2/2009
(Continued)

OTHER PUBLICATIONS

International Search Report and Written Opinion issued by the International Searching Authority dated Aug. 3, 2016 in counterpart International Patent Application No. PCT/KR2016/004428 (PCT/ISA/210 & PCT/ISA/237).
(Continued)

*Primary Examiner* — Debbie M Le
(74) *Attorney, Agent, or Firm* — Sughrue Mion, PLLC

(57) ABSTRACT

An audio contents recognition method includes receiving an audio signal; obtaining audio fingerprints (AFPs) based on a spectral shape of the received audio signal; generating hash codes for the obtained audio fingerprints; transmitting a matching query between the generated hash codes and hash codes stored in a database; and receiving a contents recognition result of the audio signal in response to the transmitting, wherein the generating of the hash codes includes: determining a frame interval delta_F of an audio fingerprint (Continued)

to generate the hash codes among the obtained audio fingerprints.

14 Claims, 23 Drawing Sheets

(51) Int. Cl.
*G06F 16/61* (2019.01)
*G10L 25/03* (2013.01)
*G10L 25/54* (2013.01)
*G10L 19/02* (2013.01)
*G10L 25/45* (2013.01)

(56) References Cited

U.S. PATENT DOCUMENTS

| | | | |
|---|---|---|---|
| 7,921,296 B2 | 4/2011 | Haitsma et al. | |
| 8,886,635 B2 * | 11/2014 | Cho | G10L 25/54 707/722 |
| 8,949,872 B2 * | 2/2015 | Slaney | H04N 21/4394 725/14 |
| 8,977,067 B1 | 3/2015 | Baluja et al. | |
| 9,009,048 B2 | 4/2015 | Jang et al. | |
| 9,268,846 B2 * | 2/2016 | Liu | G06F 16/683 |
| 9,589,283 B2 * | 3/2017 | Kim | G10L 25/48 |
| 9,837,101 B2 * | 12/2017 | Bilobrov | G10L 25/54 |
| 9,866,785 B2 * | 1/2018 | Strasser | H04N 5/63 |
| 9,866,786 B2 * | 1/2018 | Fujii | H04N 21/4621 |
| 10,418,051 B2 * | 9/2019 | Bilobrov | G06F 16/683 |
| 2016/0148620 A1 * | 5/2016 | Bilobrov | G10L 25/54 704/270 |
| 2016/0203824 A1 * | 7/2016 | Park | G10L 19/018 700/94 |

FOREIGN PATENT DOCUMENTS

| | | |
|---|---|---|
| KR | 10-0883652 B1 | 2/2009 |
| KR | 10-2011-0127385 A | 11/2011 |
| KR | 10-1315970 B1 | 10/2013 |
| WO | 2004/040475 A2 | 5/2004 |

OTHER PUBLICATIONS

Communication dated Mar. 29, 2018 issued by the European Patent Office in counterpart European Patent Application No. 16786750.6.

* cited by examiner

AUDIO CONTENT RECOGNITION METHOD AND DEVICE

TECHNICAL FIELD

The present disclosure relates to a method and device for recognizing contents of received audio data, and more particularly to, a method and device for recognizing contents of received audio data by extracting an audio fingerprint from received audio data and comparing extracted fingerprint information with fingerprint information of contents stored in a database.

BACKGROUND ART

Various types of multimedia contents may be reproduced in a terminal. When information about the multimedia contents is known, information related to the contents being reproduced may be provided to a user or an additional service related to the contents being reproduced may be provided to the user.

However, in a situation where there is no information about the contents, it is impossible to provide such an extended service.

Each of multimedia contents being reproduced in a terminal may have a unique feature. Although a technology for recognizing contents that are currently being reproduced is being developed using such a feature, there is a need for a contents recognition technology that is robust with respect to the influence of a high noise environment or an asynchronous environment such as when there is a delay of a signal.

DETAILED DESCRIPTION OF THE INVENTION

Technical Problem

As described above, a technology of determining an identification (ID) and a frame number of contents based on a unique feature of each of multimedia contents. However, the conventional technology tends to have a remarkably low recognition rate in a high noise environment or an asynchronous environment.

The present disclosure provides a contents recognition method and device, which solve the problems of the prior art described above and have a high recognition rate and stable performance even in an asynchronous and noisy environment.

Technical Solution

In order to accomplish the above objective, representative configurations of the present disclosure are as follows.

According to an embodiment of the present disclosure, an audio contents recognition method includes receiving an audio signal; obtaining audio fingerprints (AFPs) based on a spectral shape of the received audio signal; generating hash codes for the obtained audio fingerprints; transmitting a matching query between the generated hash codes and hash codes stored in a database; and receiving a contents recognition result of the audio signal in response to the transmitting, wherein the generating of the hash codes includes: determining a frame interval delta_F of an audio fingerprint to generate the hash codes among the obtained audio fingerprints.

The audio fingerprint may be determined based on a frequency domain spectral shape of the received audio signal.

The frame interval delta_F may be generated based on a spectral size difference between adjacent frames of the obtained audio fingerprints.

The generating of the hash codes may include: applying a weight determined based on frequency domain energy of the obtained audio fingerprints.

The transmitting of the matching query may include: determining hash codes to transmit a matching query and a transmission priority of the hash codes to transmit the matching query among the generated hash codes based on the number of bit variations between hash codes corresponding to frames adjacent to each other.

The contents recognition result may be determined based on contents identifications (IDs) of the hash codes that transmitted the matching query and a frame concentration measure (FCM) of a frame domain.

The audio signal may include at least one of channel audio and object audio.

The audio contents recognition method may further include: analyzing an audio scene feature of the received audio signal; and setting a section to obtain an audio fingerprint based on the audio scene feature, wherein the obtaining of the audio fingerprint includes: obtaining an audio fingerprint for the section of interest.

The audio contents recognition method may further include: receiving an audio contents recognition command and a matching query transmission command, wherein the obtaining of the audio fingerprint includes: obtaining the audio fingerprint for a section from a time when the audio contents recognition command is received to a time when the matching query transmission command is received.

The generating of the hash codes may include: if audio fingerprints having the same value are present among the obtained audio fingerprints, deleting the audio fingerprints having the same value except for one.

According to another embodiment of the present disclosure, an audio contents recognition method includes receiving an audio signal; obtaining audio fingerprints (AFPs) of the received audio signal; generating hash codes for the obtained audio fingerprints; matching the generated hash codes and hash codes stored in a database; and recognizing contents of the audio signal based on a result of the matching, wherein the generating of the hash codes includes: determining a frame interval $\Delta_F$ of an audio fingerprint to generate the hash codes among the obtained audio fingerprints.

According to another embodiment of the present disclosure, an audio contents recognition device includes a multimedia receiver configured to receive an audio signal; an audio fingerprint obtainer configured to obtain audio fingerprints (AFPs) of the received audio signal; a hash code generator configured to generate hash codes for the obtained audio fingerprints, transmit a matching query between the generated hash codes and hash codes stored in a database, and receive a contents recognition result of the audio signal in response to the transmitting, wherein the hash code generator determines a frame interval delta_F of an audio fingerprint to generate the hash codes among the obtained audio fingerprints.

According to another embodiment of the present disclosure, an audio contents recognition device includes a multimedia receiver configured to receive an audio signal; an audio fingerprint obtainer configured to obtain audio fingerprints (AFPs) of the received audio signal; a hash code generator configured to generate hash codes for the obtained audio fingerprints; and a matcher configured to match the generated hash codes and hash codes stored in a database and recognize contents of the audio signal based on a result of the matching, wherein the hash code generator determines a frame interval delta_F of an audio fingerprint to generate the hash codes among the obtained audio fingerprints.

According to another embodiment of the present disclosure, a computer-readable recording medium having recorded thereon a computer program for implementing the method is provided.

Also, another method for implementing the present disclosure, another system, and a computer-readable recording medium for recording a computer program for executing the method are further provided.

Advantageous Effects

According to the present disclosure, an audio contents recognition method and device having good performance even in a noisy environment and an asynchronous environment may be provided, and may be applied to a non-periodic signal, a non-continuous signal, or a signal having a short length, and thus may be extended to various service scenarios.

MODE OF THE INVENTION

Figure 1:
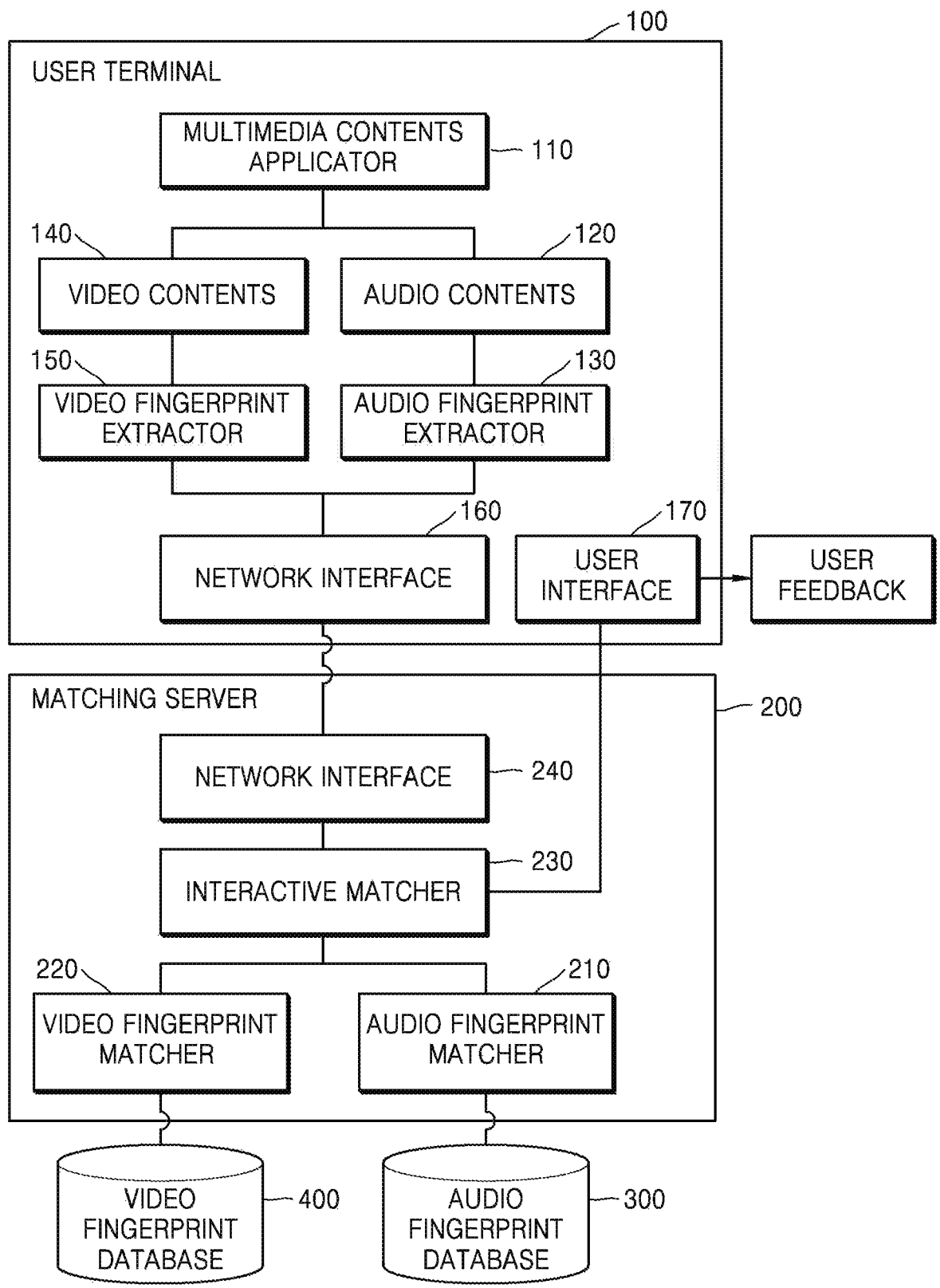
FIG. 1 is a block diagram of a contents recognition system according to an embodiment of the present disclosure.

In order to accomplish the above object, a representative configuration of the present disclosure is as follows.

According to an embodiment of the present disclosure, an audio contents recognition method includes receiving an audio signal; obtaining audio fingerprints (AFPs) based on a spectral shape of the received audio signal; generating hash codes for the obtained audio fingerprints; transmitting a matching query between the generated hash codes and hash codes stored in a database; and receiving a contents recognition result of the audio signal in response to the transmitting, wherein the generating of the hash codes includes: determining a frame interval delta_F of an audio fingerprint to generate the hash codes among the obtained audio fingerprints.

The detailed description of the present disclosure given below refers to the accompanying drawings, which illustrate, by way of example, specific embodiments in which the present disclosure may be practiced. These embodiments are described in sufficient detail to enable one of ordinary skill in the art to practice the invention. It should be understood that the various embodiments of the present disclosure may different from one another, but need not be mutually exclusive.

For example, the specific shapes, structures, and characteristics described in this specification may be modified and changed from an embodiment to another without departing from the spirit and scope of the present disclosure. It should also be understood that the position or arrangement of individual components within each embodiment may be changed without departing from the spirit and scope of the present disclosure. Accordingly, the following detailed description is not to be taken in a limiting sense, and the scope of the present disclosure should be construed as encompassing the scope of the appended claims and all equivalents thereof.

Like reference numerals in the drawings denote like or similar components throughout the several aspects. In order to clearly illustrate the present disclosure, parts not related to the description of the present disclosure are omitted, and like parts are denoted by like reference numerals throughout the specification.

Hereinafter, various embodiments of the present disclosure will be described in detail with reference to the accompanying drawings so that those skilled in the art may easily carry out the present disclosure. The present disclosure may, however, be embodied in many different forms and should not be construed as limited to the embodiments set forth herein.

Throughout the specification, it will be understood that when a portion is referred to as being "connected to" another portion, it may be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, embodiments of the present disclosure will be described in detail with reference to the accompanying drawings.

Multimedia contents may be provided to a user through a user terminal including a TV, a radio receiver, a digital multimedia broadcasting (DMB) or a smart phone. At this time, the user may have a question about additional information about the provided multimedia contents, for example, a program name, a social issue related to a performer or a program, and the like. Also, a contents provider may need to grasp contents usage types or preferences of users or monitor a usage status of the contents provided to the user in order to provide an additional service based on the contents usage types or preferences.

If the multimedia contents include information about the related contents, the information may be used to provide additional information or an additional service. However, if the information is not included in the multimedia contents, a technology of recognizing the contents based on a feature of a multimedia signal received or reproduced by the user terminal may be utilized.

FIG. 1 is a block diagram of a contents recognition system according to an embodiment of the present disclosure. More specifically, FIG. 1 shows an embodiment of a video-audio hybrid contents recognition (VAHCR) system.

The VAHCR system extracts feature points from a video signal and an audio signal received in a user terminal, compares the extracted feature points with feature point information of each of contents stored in a database, identifies and recognizes the contents.

In this regard, the extracted feature points should be able to describe unique information possessed by each of the contents, and even if quality of a received multimedia signal deteriorates, stable contents recognition should be possible. Factors causing deterioration of the quality of the received multimedia signal include an asynchronous system, a high noise ratio, a format conversion error, a quantization error, etc.

A feature point of each signal used for multimedia recognition is referred to as a multimedia fingerprint. A feature point of a video signal is referred to as a video fingerprint (VPF). A feature point of an audio signal is referred to as an audio fingerprint (APF). The multimedia fingerprint is generally converted into a hash code composed of a binary code. The hash code is also referred to as a hash key or a hash value.

However, since the video fingerprint or the audio fingerprint may be used as it is according to an embodiment, a configuration for converting the multimedia fingerprint into the hash code is not essential. It should be noted that a configuration in which the video fingerprint and the audio fingerprint are converted into hash codes is omitted in an embodiment disclosed in FIG. 1, and a fingerprint and the hash code are used in a similar meaning.

The VAHCR system disclosed in FIG. 1 largely includes a user terminal 100, a matching server 200, an audio fingerprint database 300, and a video fingerprint database 400.

The user terminal 100 includes a multimedia contents applicator 110 for reproducing multimedia contents, an audio fingerprint extractor 130 for extracting audio fingerprint data from audio contents 120, a video fingerprint extractor 150 for extracting a video fingerprint from video contents 140, a network interface 160 for transmitting the extracted audio fingerprint and video fingerprint to the matching server 200 and receiving a matching result transmitted from the matching server 200, and a user interface 170 for an interaction with a user.

The matching server 200 includes an audio fingerprint matcher 210 for comparing audio fingerprints of entire audio contents stored in the audio fingerprint database 300 and an audio fingerprint transmitted from the user terminal, a video fingerprint matcher 220 for comparing audio fingerprints of entire video contents stored in the video fingerprint database 400 and a video fingerprint transmitted from the user terminal, an interactive matcher 230 for performing interactive matching based on a matching result of the audio fingerprint matcher 210 and a matching result of the video fingerprint matcher 220, and a network interface 240 for receiving audio fingerprints, video fingerprints, etc. transmitted from the user terminal 100 and transmitting a multimedia contents fingerprint matching result or a contents recognition result to the user terminal 100.

The audio fingerprint database 300 and the video fingerprint database 400 store audio fingerprints and video fingerprints for each of entire multimedia contents that may be provided to the user terminal 100. The audio fingerprints and the video fingerprints for each of the entire multimedia contents may be generally provided by a contents provider (CP), but they may be created and used by a separate entity.

In FIG. 1, although the audio fingerprint database 300 and the video fingerprint database 400 are shown outside the matching server 200, the audio fingerprint database 300 and the video fingerprint database 400 may be implemented inside the matching server 200 according to an embodiment. In FIG. 1, although the user terminal 100 and the matching server 200 are configured as separate devices, the user terminal and the matching server may be configured as a single device.

When the multimedia fingerprint matching result or the contents recognition result is received from the matching server 200, the user terminal 100 may provide the multimedia fingerprint matching result or the contents recognition result to the user through the user interface 170. Alternatively, the user terminal 100 may provide the user with an additional service, etc. related to multimedia contents currently being reproduced according to a rule determined by the contents provider or an additional service provider.

In addition to search/recognition of contents being reproduced in a current user terminal or broadcast monitoring through the contents recognition, which is the most popular service, information related to the contents being reproduced in the current user terminal (TV) may be provided through a second screen terminal such as a smart phone or a tablet, etc. Alternatively, a customized advertisement such as an advertisement related to the contents may be provided.

In addition, offline contents may be recognized, streaming contents reproduced in other devices may be recognized, related app services may be provided, and extensions to a data duplication management and copyright related business are possible.

Figure 2:
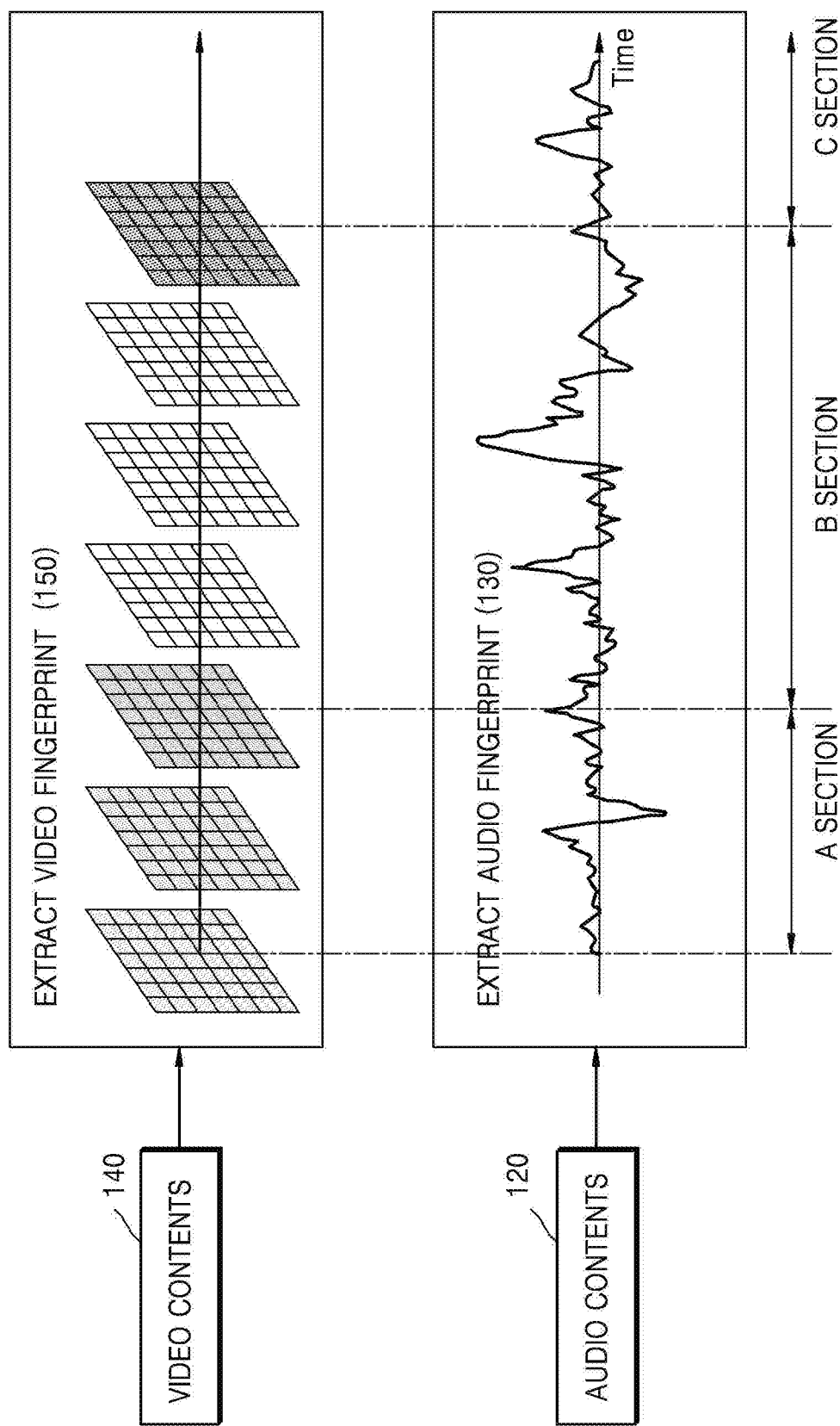
FIG. 2 is a diagram for explaining a method of using a video fingerprint and an audio fingerprint in a video-audio hybrid contents recognition system, according to an embodiment of the present disclosure.

FIG. 2 is a diagram for explaining a method of using a video fingerprint and an audio fingerprint in a video-audio hybrid contents recognition system according to an embodiment of the present disclosure.

If there is no limit to system performance and data storage capacity, both video fingerprint and audio fingerprint may be used to increase a contents recognition rate. However, since this is impossible in practice, one of the audio fingerprint and the video fingerprint may be actually adopted as a main strategy and a remaining fingerprint may be used as an auxiliary means.

It is assumed in FIG. 2 that while a video contents recognition (VCR) method using a video fingerprint is basically used, an audio contents recognition (ACR) method is auxiliary used in a section in which a contents recognition rate of video contents recognition deteriorates.

In a video fingerprint extraction process of FIG. 2, seven time domain samples exist. A section A corresponding to a time from receiving a first sample until receiving a third sample corresponds to a section in which validity of the video contents recognition is high since the video fingerprint has a sufficient variation over time. However, since subsequent three samples are composed of the same or very similar samples, information for the video contents recognition is insufficient. Therefore, a section B corresponding to the three samples corresponds to a section in which the validity of the video contents recognition is low.

Even if resolution of the video fingerprint is low, the audio fingerprint may have sufficient information for contents recognition. Thus, if audio contents recognition is supplementally performed, the multimedia contents recognition rate may be maintained.

On the contrary, while the audio contents recognition method is basically used, video contents recognition may be performed in a section in which validity of audio contents recognition is low, such as when the same background sound is repeated or audio volume is low.

Alternatively, even if the video contents recognition method is basically used, the audio contents recognition method may be periodically applied for faster switching to the audio contents recognition method when the section in which the resolution of the video fingerprint is low is generated like the section B of FIG. 2. In such a case, a more efficient application is possible by dividing the audio fingerprint matching method into two pieces. A matching method having a low computational complexity and a fast response speed may be applied in a section in which the video contents recognition method has a sufficient resolution as in the A section and a more precise matching method may be applied in a section in which the video contents recognition method is not applicable as in the B section based on a previous audio fingerprint matching result, and thus a highly reliable contents recognition result may be obtained.

As mentioned above, a video fingerprint or an audio fingerprint must include unique information representing the video fingerprint or the audio fingerprint from a part of each of contents and should provide a stable contents recognition rate even if deterioration of a received signal occurs.

In the audio contents recognition method, quality deterioration of an audio signal may occur depending on application environments such as noise due to channel interference and signal asynchronism, and audio contents recognition performance may be degraded.

In order to minimize an effect of the quality deterioration, a signal interval for generating an audio fingerprint database may be densely set. However, when the number of broadcast channels is increased and a high capacity contents service is provided, if the signal interval for generating the audio fingerprint database is densely set, there are problems that capacity of the audio fingerprint database becomes excessively large and an amount of matching calculation increases exponentially.

According to the Philips Robust Has (PRH) method, which is a typical audio contents recognition method, an audio fingerprint is generated using a sign of an energy band difference with respect the time and frequency axes. In this case, in order to compensate for errors due to time mismatch between fingerprint information requested to be matched from a user terminal and original fingerprint information stored in a database, although an overlap ratio between frames should be kept high, a high redundancy ratio increases the database size of audio fingerprints and increases an amount of computation.

Another audio contents recognition method is a method of using a constellation map for a local peak in the time and frequency domain. Although the local peak is an audio feature robust to environmental noise, it has a disadvantage that it is difficult to apply the local peak to online multimedia contents recognition requiring a fast response speed.

In a real-time contents recognition technology, a time mismatch between the fingerprint information requested to be matched from the user terminal and the original fingerprint information stored in the database is the most important factor affecting the contents recognition rate. Therefore, in an audio contents recognition technology, it is an important technical problem to generate an audio fingerprint robust to the time mismatch.

Figure 3:
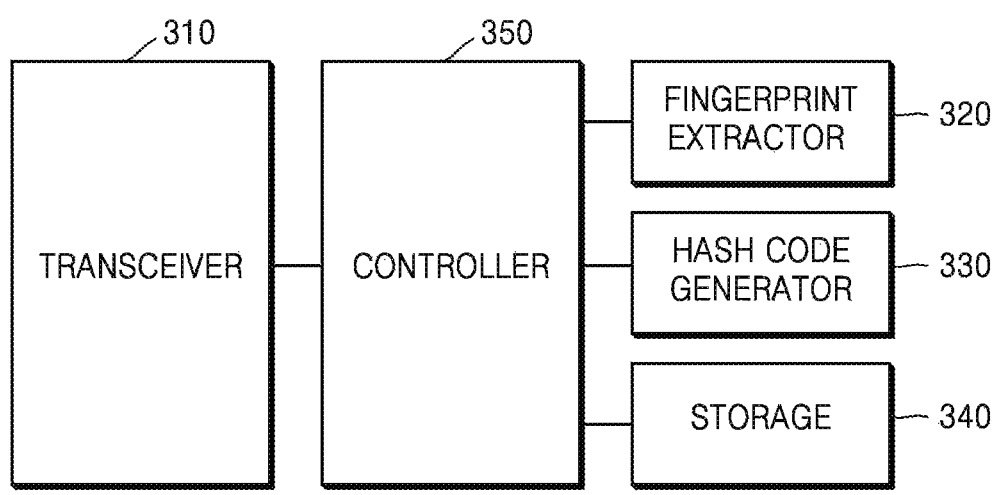
FIG. 3 is a block diagram of an audio contents recognition device according to an embodiment of the present disclosure.

FIG. 3 is a block diagram of an audio contents recognition device according to an embodiment of the present disclosure.

The audio contents recognition device according to an embodiment of the present disclosure includes a transceiver 310, a fingerprint extractor 320, a hash code generator 330, a storage 340, and a controller 350.

The transceiver 310 may include an interface for communicating with the outside, receive multimedia contents or the like transmitted from the outside, transmit a multimedia fingerprint matching query, and receive a multimedia fingerprint matching result or a contents recognition result.

An audio fingerprint based on a spectral shape feature is extracted from multimedia contents received through the fingerprint extractor 320 and the transceiver 310, particularly, audio contents.

The hash generator 330 generates a hash code based on the audio fingerprint extracted from the fingerprint extractor 320. The hash code is an exploration key for retrieving stored data and is used to find an index of a database stored in an array.

When the audio fingerprint is directly used for matching according to an embodiment, the hash generator 330 may be omitted.

The storage 340 stores various types of information necessary for the audio contents recognition device to recognize the audio contents and various types of information necessary for the audio contents recognition device to process system data.

The controller 350 controls operations of the audio contents recognition device, and controls the transceiver 310, the fingerprint extractor 320, the hash code generator 330, and the storage 340 for the audio contents recognition device to deliver the audio fingerprint or the audio fingerprint hash code to a matching server.

Figure 4:
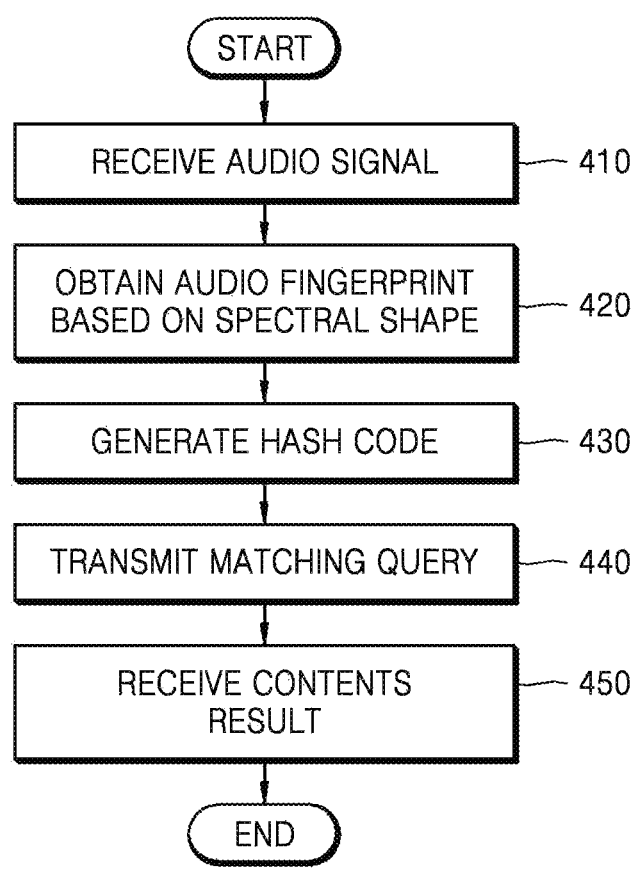
FIG. 4 is a flowchart of an audio contents recognition method according to an embodiment of the present disclosure.

FIG. 4 is a flowchart of an audio contents recognition method according to an embodiment of the present disclosure.

An audio contents recognition device receives multimedia contents through the transceiver 310 (410). The multimedia contents may include video contents and audio contents. The audio contents may include at least one of channel audio and object audio. Although the audio contents have been described in the present specification for the sake of convenience, the present disclosure is not limited to the audio contents and may be equally applied to the video contents.

The fingerprint extractor 320 of the audio contents recognition device obtains an audio fingerprint based on the received multimedia contents 420. Although various kinds of audio signal feature points for generating the audio fingerprint are used, in an embodiment of the present disclosure, a spectral shape of a frequency domain is used as a feature point.

Parameters of the spectral shape include a linear prediction coefficient (LPC), a Mel-frequency ceptrum coefficient (MFCC), and a line spectrum frequency, etc. In the present disclosure, LSF algorithm is used for time-varying modeling of a vocal signal, but the present disclosure is not limited thereto in its entirety.

Considering the audio signal in the frequency domain, the audio signal has a feature that even if power (energy) in a frequency band changes, an overall shape is not affected greatly. Thus, the parameters for the spectral shape may be a stable feature point for an environmental change such as noise or an asynchronism.

The hash code generator 330 of the audio contents recognition device generates a hash code using the obtained audio fingerprint (430). The hash code is obtained by converting audio fingerprint information into a bit-string shape. A method of generating the hash code according to an embodiment of the present disclosure will be described later in detail.

If the hash code is generated, the audio contents recognition device transmits the generated hash code and a matching query to a matching server 440, and receives a matching result or a contents recognition result from the matching server 450.

Figure 5:
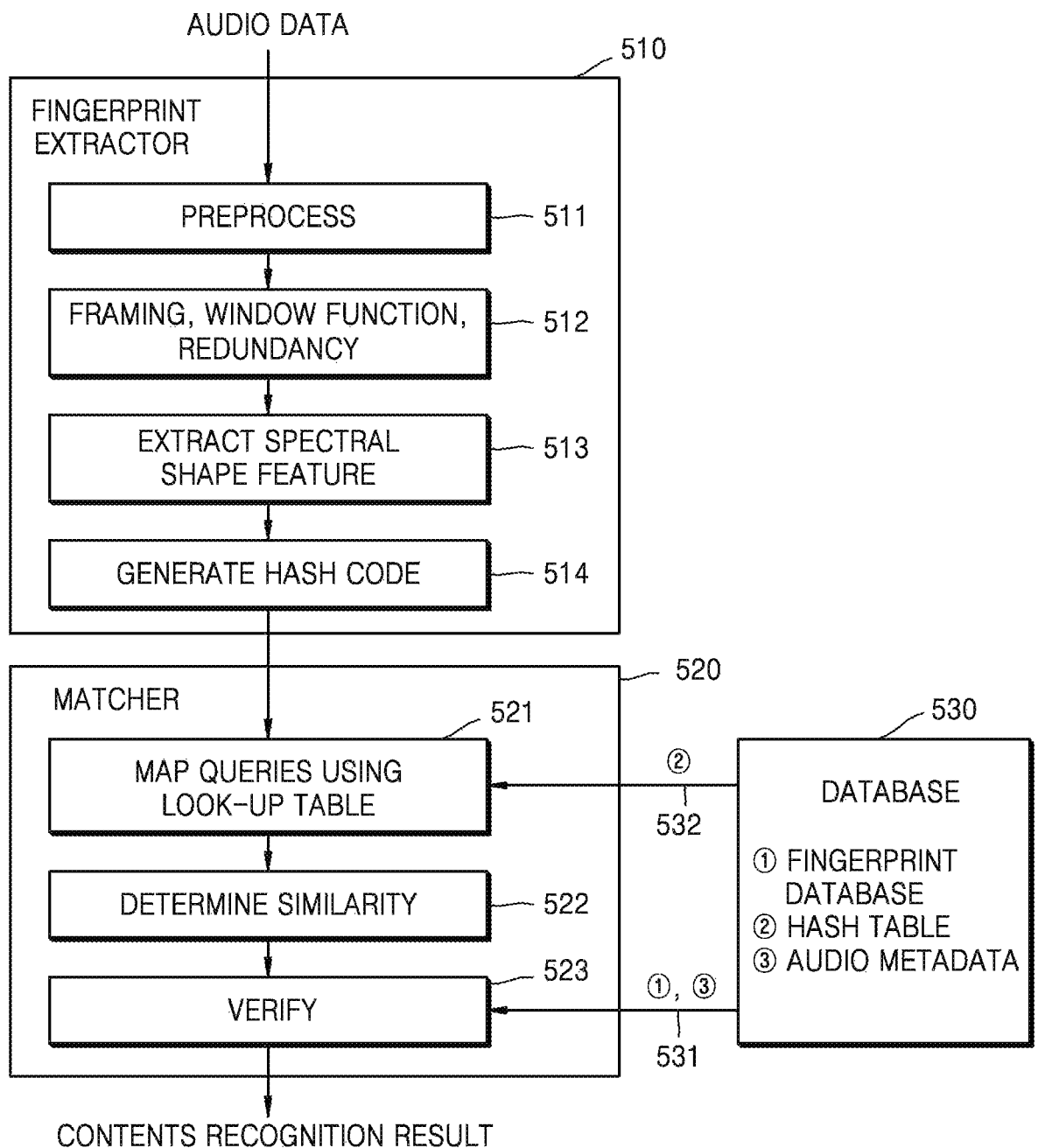
FIG. 5 is a detailed operation flowchart of an audio contents recognition system according to an embodiment of the present disclosure.

FIG. 5 is a detailed operation flowchart of an audio contents recognition system according to an embodiment of the present disclosure.

The audio contents recognition system according to an embodiment of the present disclosure shown in FIG. 5 includes a fingerprint extractor 510, a matcher 520, and a database 530.

When audio data is received in the fingerprint extractor 510, the fingerprint extractor 510 preprocesses the received audio data (511). A preprocessing process of a general audio signal corresponds to a process of converting the received audio data into a mono pulse coded modulation (PCM) signal and performing band pass filtering in consideration of an audio frequency band.

The preprocessed audio signal is framed into frames in a time domain. Each frame windows a window function to reduce discontinuity of frame start and end points. In order to prevent a sudden change of an audio fingerprint value generated in each frame, each frame boundary is overlapped with an adjacent frame. An overlap ratio with the adjacent frame is a factor affecting a size of an audio fingerprint database and an amount of search calculation.

An audio signal feature is extracted for generating the audio fingerprint from the completely overlapped audio signal (513). Although various kinds of audio signal feature points for generating the audio fingerprint are used, in an embodiment of the present disclosure, a spectral shape of a frequency domain is used as a feature point.

Parameters of the spectral shape include a linear prediction coefficient (LPC), a Mel-frequency ceptrum coefficient (MFCC), and a line spectrum frequency, etc. In the present disclosure, LSF algorithm is used for time-varying modeling of a vocal signal, but the present disclosure is not limited thereto in its entirety.

Considering the audio signal in the frequency domain, the audio signal has a feature that even if power (energy) in a frequency band changes, an overall shape is not affected greatly. Thus, the parameters for the spectral shape may be a stable feature point for an environmental change such as noise or asynchronism.

An audio fingerprint is extracted based on the spectral shape, and a hash code is generated using the extracted audio fingerprint (514). The hash code is obtained by converting audio fingerprint information into a bit-string shape. A method of generating the hash code according to an embodiment of the present disclosure will be described later in detail.

When the generated hash code and a matching query for the hash code are transmitted to the matcher 520, the matcher 520 receives a hash table from the database 530 (532). The hash table is a table composed of hash codes for original data. A look-up table (LUT) including a contents ID and frame information for each contents ID are used to perform mapping of the look-up table and contents of which request is received.

Then, based on a mapping result of the look-up table and the contents, similarity between the received contents and original contents stored in a database is determined (522) and verified (523). More details of matching and determination methods according to an embodiment of the present disclosure will be described later.

When hash code matching is completed, metadata of the related audio contents along with an ID and a frame number of the recognized audio contents based on the matching result may be transmitted from the database 530 to the matcher 520 (531). Also, along with the ID and the frame number of the recognized audio contents, the metadata for the related audio contents may be output (not shown) through a user interface or stored (not shown) in a storage.

Figure 6:
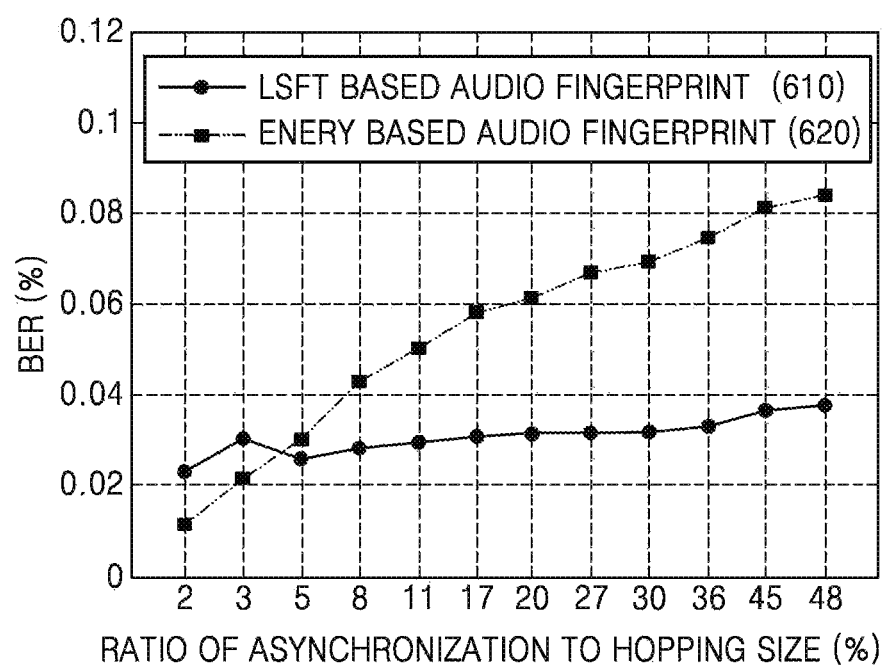
FIG. 6 shows error rates of a line spectral frequency (LSF)-based audio fingerprint and an energy-based audio fingerprint in an asynchronous environment.

FIG. 6 shows error rates of an LSF-based audio fingerprint and an energy-based audio fingerprint in an asynchronous environment.

In FIG. 6, a horizontal axis represents a ratio of asynchronous samples to a time-domain hopping size (hop size), the rate of asynchronous samples increases toward the right, and a vertical axis represents a bit error rate (BER).

610 denotes a hash code bit error rate when LSF is used as an audio fingerprint feature point. 620 denotes a hash code bit error rate when frequency sub band energy is used as the audio fingerprint feature point.

Referring to FIG. 6, when the frequency sub band energy is used as the audio fingerprint feature point, the hash code bit error rate increases sharply as the ratio of the asynchronous samples increases. On the other hand, when the LSF is used as the feature point of the audio fingerprint according to an embodiment of the present disclosure, an error rate is maintained and the stable performance exhibits even if the ratio of the asynchronous samples increases.

Figure 7:
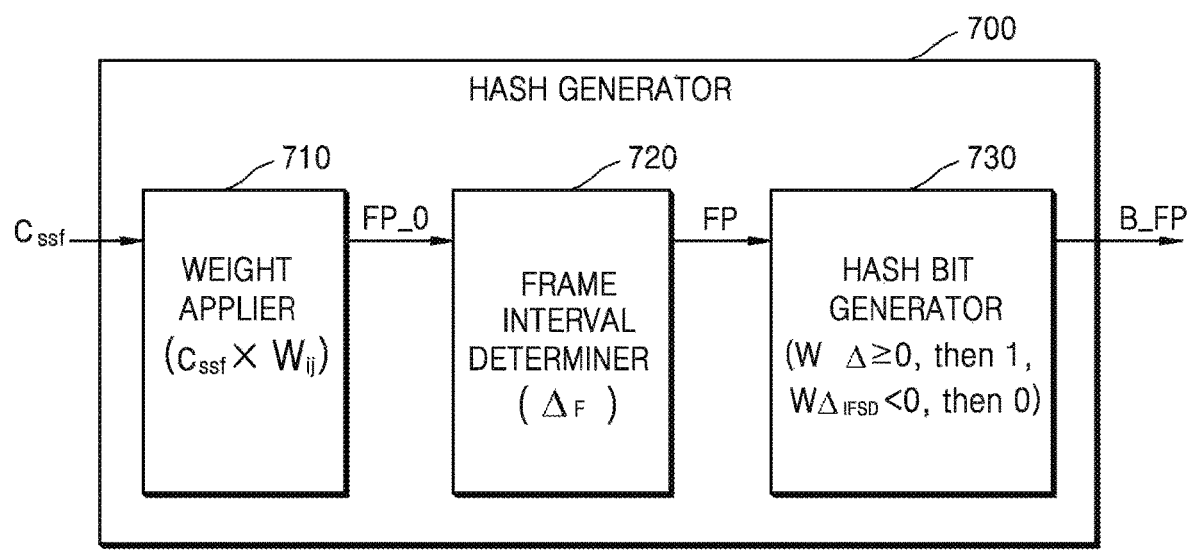
FIG. 7 is a block diagram of a hash code generator according to an embodiment of the present disclosure.

FIG. 7 is a block diagram of a hash code generator 700 according to an embodiment of the present disclosure.

The hash code generator 700 shown in FIG. 7 includes a weight applier 710, a frame interval determiner 720, and a hash bit generator 730.

In the embodiment shown in FIG. 7, an input of the hash code generator 700 is a coefficient for a spectral shape feature. In the present disclosure, a linear spectrum frequency (LSF) is used for the sake of convenience. However, the present disclosure is not limited to this method. An output is a hash code B_FP for an audio fingerprint, which is a bit string having a size of N_c bits.

As mentioned above, feature points for a spectral shape are robust to signal noise or asynchronous sample generation, but are not significantly changed over time frames. Therefore, when a hash code is generated by using a feature difference between adjacent frames, an error occurrence probability increases. In such a case, if a process of amplifying the feature difference that is a reference for generating the hash code is added, a possibility of such an error occurrence may be reduced.

According to a hash code generation method robust to environment degradation according to an embodiment of the present disclosure, a difference of a feature coefficient may be amplified by applying a weight to a spectral shape feature coefficient. To this end, the weight applier 710 applies a weight to an input signal c_ssf to amplify a difference of features of adjacent frames.

In order to convert the audio fingerprint into the hash code stably without being affected by the environment deterioration, a deviation between a reference value that is a reference for generating a binary code and an input signal must be large. In this regard, the reference value is determined by a previous frame.

For example, when LSF is used, discrete cosine transform (DCT) coefficients or LSF indexes have a very similar value in adjacent frames, and as a result, the reference value and the input signal have a small deviation. Therefore, when the hash code is generated using a difference between DCT coefficients or LSF index values between adjacent frames in an environment where a noise ratio is high or the asynchronous sample ratio is high, the error rate increases.

In order to solve such a problem, in an embodiment of the present disclosure, to amplify a difference of feature points of adjacent frames, the hash code is generated by using a moment of a high order, other than a $0^{th}$ order moment that uses the DCT coefficient or the LSF index value as it is.

For example, by applying the LSF index value and a power spectral density (PSD) corresponding to the LSF index value as weights, a coefficient of a feature point with an enhanced deviation may be newly defined.

c_ssf (i)×W_ij obtained by applying a weight W_ij corresponding to a frequency power density of a corresponding coefficient to c_ssf (i, j) of an ith frame and a jth frequency bin is used as a new audio fingerprint FP_new (i).

Alternatively, a group of largest values among values obtained by multiplying the LSF index value by respective mel-scale filters may be used as a new audio fingerprint.

According to the hash code generation method robust to environment degradation according to another embodiment of the present disclosure, a feature difference may be amplified by generating a hash code based on frames having a predetermined frame interval instead of adjacent frames. To this end, the frame interval determiner 720 determines a frame interval delta_F for generating a hash code based on a DCT coefficient difference change.

As mentioned above, since DCT coefficients of the spectral shape based feature between adjacent frames have a similar pattern, when the frame interval delta_F for generating the hash code increases, a DCT coefficient difference of reference frames increases, and thus the hash code robust to noise may be generated. However, if the frame interval delta_F increases, since the number of hash codes that may be generated decreases, there is a problem in that an amount of information available for contents recognition decreases.

Since the increase in the delta_F size or the decrease in the number of hash codes affects a matching computation amount, a contents recognition rate, a database size, or a distribution of hash codes in a hash table, etc. it is necessary to determine delta_F appropriate to a system environment in consideration of a trade-off relationship.

When the frame interval delta_F is determined, the hash bit generator 730 generates a hash code B_FP based on the determined delta_F.

Figure 8:
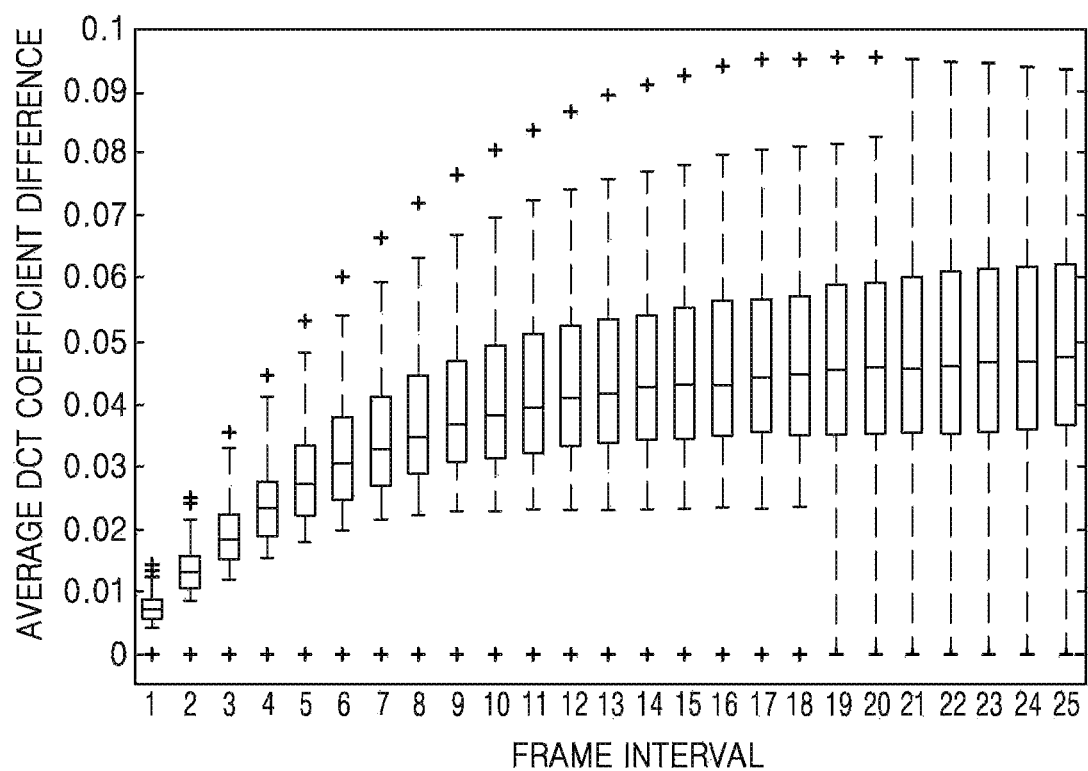
FIG. 8 is a diagram illustrating delta_LSF with respect to a variation of a frame interval delta_F according to an embodiment of the present disclosure.

FIG. 8 is a diagram illustrating delta_LSF with respect to a variation of a frame interval delta_F according to an embodiment of the present disclosure.

For example, with respect to an audio stream with a duration of 1.024 seconds, 225 frames with a 2048 sample length at 96.9% (31/32) redundancy and a sampling frequency of 16 kHz may be obtained. That is, 225 sets of LSFs may be obtained for a stream, and DCT is performed on an LSF obtained for de-correlation.

When a size of a hash code is Nc bits, and Nc=17, if the number of LSFs per frame is 17, and the LSF for an n_Frth frame of n_ID contents is $LSF_i(n_{ID}, n_{Fr})$, delta_LSF may be defined as [Equation 1] below:

$$\Delta_{LSF_i} = |LSF_i(n_{ID}, n_{Fr}) - LSF_i(n_{ID}, n_{Fr} + \Delta_F)|,$$
$$(i=1, \ldots, N\_c) \quad \text{[Equation 1]}$$

FIG. 8 shows delta_LSF, which is an average of delta_LSF_i corresponding to an LSF deviation between two reference frames according to the frame interval delta_F in the above environment.

As may be seen from FIG. 8, delta_LSF tends to also increase as delta_F increases. As the delta_F increases, the delta_LSF also increases, and thus a bit error rate decreases in hash code matching. However, since the number of matching hash codes decreases as delta_F increases, an optimal delta_F may be determined as a point at which the delta_LSF increase is slowed down. In FIG. 8, delta_F may be set to 20.

According to another embodiment of the present disclosure, not only DCT coefficients having the same degree but also a difference of the DCT coefficients of different orders may be used as additional information to determine delta_F.

Figure 9:
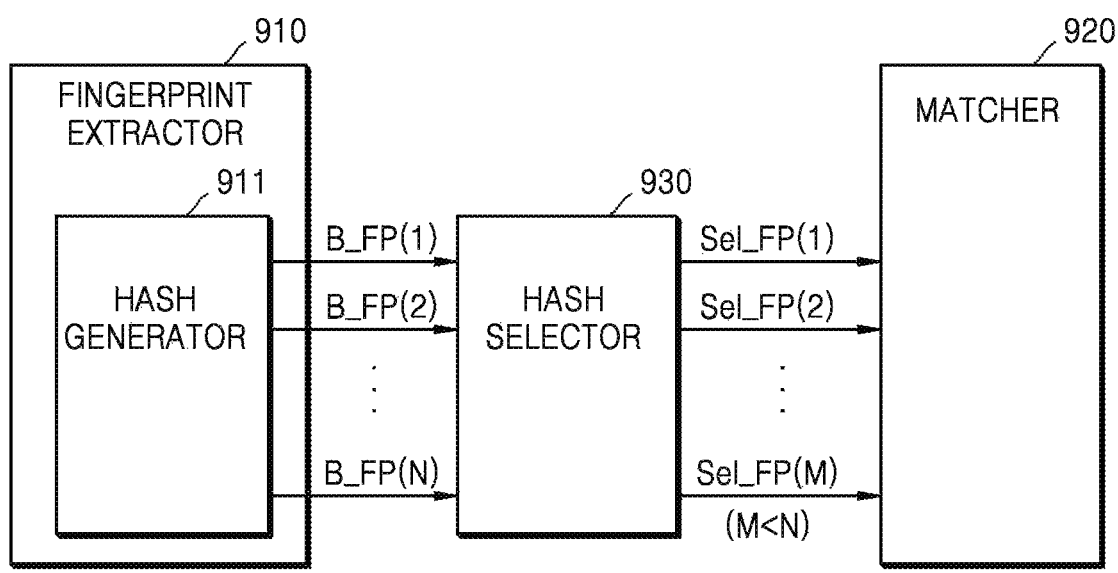
FIG. 9 is a block diagram of a contents recognition system according to another embodiment of the present disclosure.

FIG. 9 is a block diagram of a contents recognition system according to another embodiment of the present disclosure.

As mentioned above, as a size of the contents database increases, an amount of computation for contents recognition and a size of a hash database in a database increase. In addition to the above-described embodiment of the present disclosure, the amount of computation may be reduced by performing matching using hash codes selected from generated hash codes.

A fingerprint extractor 910 for obtaining a fingerprint feature point transmits a matching query for hundreds of hash codes generated by processing samples in units of seconds. At this time, a matcher 920 identifies contents based on the hash codes transmitted from the fingerprint extractor 910 and a hash table transmitted from the database.

The hash table is a set of audio data information for each hash code value when converting the contents database into hash codes and is generally in the form of a look-up table.

In this case, performing matching using all the received hash codes may be inefficient in terms of a matching rate (an error rate) with respect to the amount of computation. For example, when the same hash code is present, since the same hash code corresponds to redundant data, performing matching using the same hash code is meaninglessly using system resources.

Therefore, a hash code selector 930 for selecting a hash code for the matching query in this respect may be added, and thus the system resources may be more efficiently used.

Figure 10:
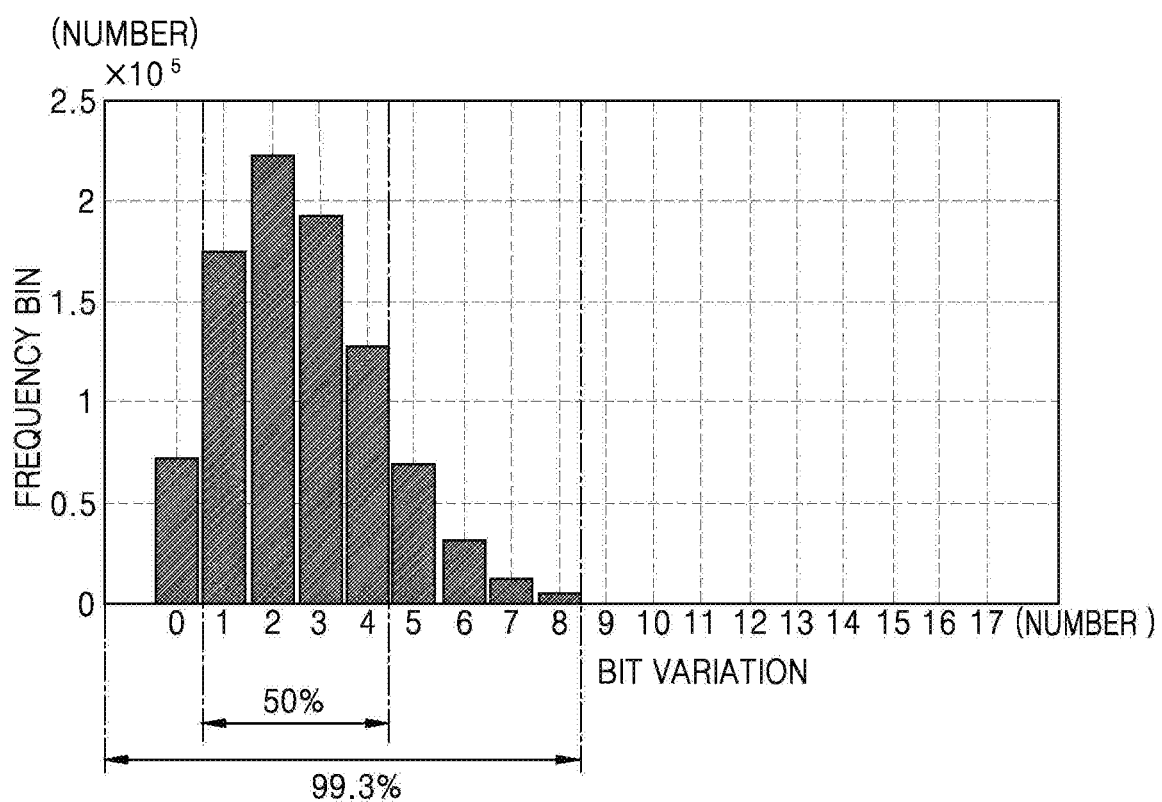
FIG. 10 is a diagram showing the number of frequency bins with respect to the number of bit variations between adjacent hash codes.

FIG. 10 is a diagram showing the number of frequency bins with respect to the number of bit variations between adjacent hash codes.

When an audio fingerprint feature point based on a spectral shape, which corresponds to an embodiment of the present disclosure, is used, a hash code generated based on the audio fingerprint feature point has a feature that is not sensitive to a change of time.

FIG. 10 is a histogram showing the number of bits varying when a predetermined hash code is compared with a hash code of an adjacent frame when each frame is converted into a hash code composed of 17 bits. As shown in FIG. 10, it may be seen that a case where only two of 17 bits change on the average is the highest, and about 50% of the entire data changes by 1 to 4 bits. At this time, a case where no bit of the entire data changes corresponds to about 7%, and a case where bits exceeding 8 change corresponds to only 0.7%.

When bits are not changed at all, since each frame has the same hash code, a redundant arithmetic operation may be prevented by deleting hash codes excluding one hash code of the same hash codes.

Also, since the case where the bits exceeding 8 change corresponds to only 0.7%, even if a section having a low reliability is deleted, the recognition rate is not greatly affected. Therefore, the amount of computation may be further reduced through such a process.

According to another embodiment of the present disclosure, the amount of computation may be reduced by changing a hash code transfer order for matching. In a matcher, since matching is performed in the order in which matching queries are received, a hash code having a high matching probability is first transmitted, thereby reducing a re-transmission rate due to a matching failure, and thus more efficient contents recognition is possible.

For example, a matching query transmission order may preferentially transmit a section in which a bit change of a hash code frequently occurs, and in the embodiment shown in FIG. 10, matching queries may be transmitted in the order of 2-bit variation sample-3-bit variation sample-1-bit variation sample-4-bit variation sample.

A query transmission order may be determined based on the hash code generated by a fingerprint extractor or a query transmission order may be determined based on a hash code in the database. When the query transmission order is determined based on the hash code in the database, the matcher must transmit the determined query order to a hash generator or a hash selector. The hash generator or the hash selector transmits the generated hash code according to the transmitted query transmission order to the matcher.

Figure 11:
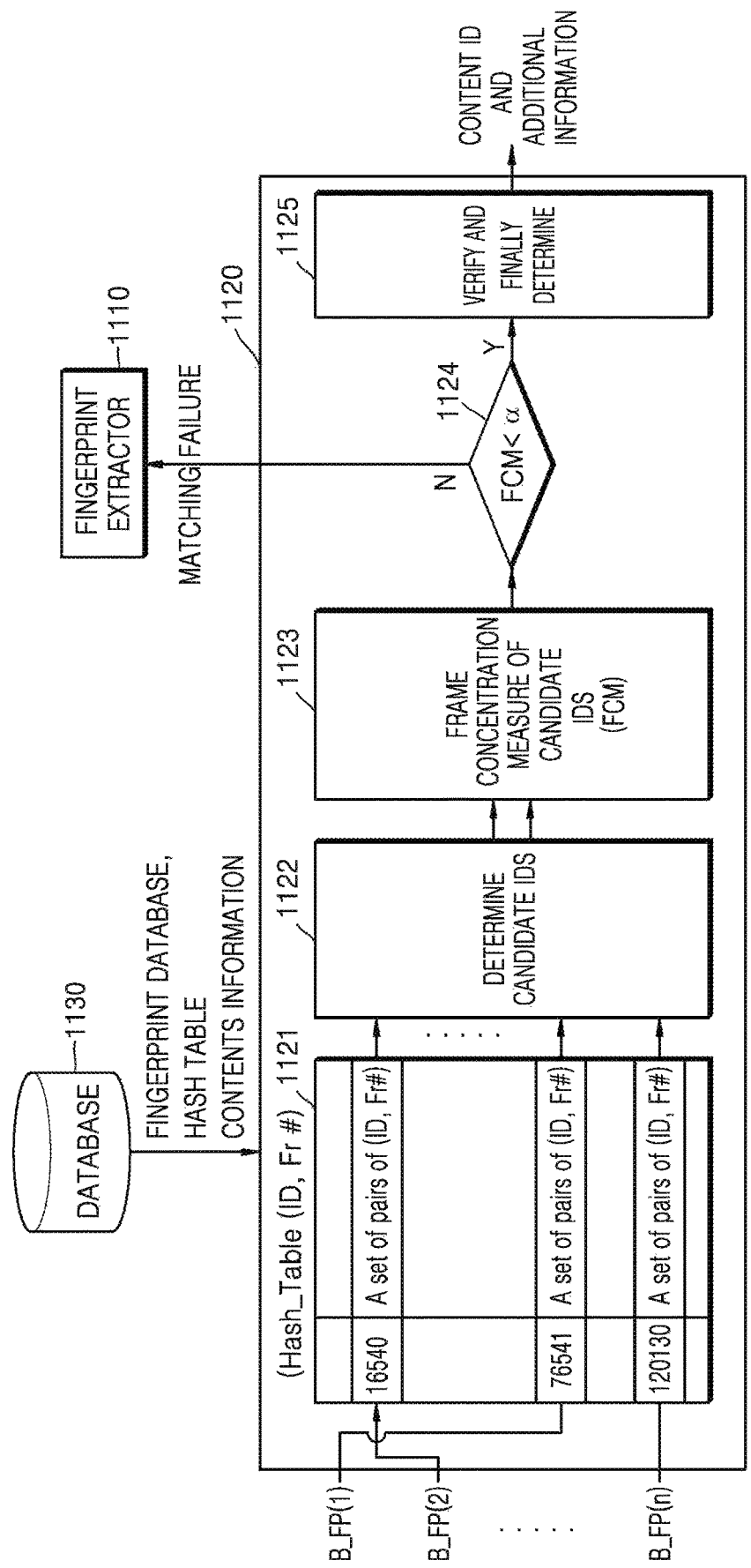
FIG. 11 is a block diagram of a matcher according to an embodiment of the present disclosure.

FIG. 11 is a block diagram of a matcher 1220 according to an embodiment of the present disclosure.

The matcher 1220 uses hash data B_FP included in a matching query transmitted from a fingerprint extractor 1210 and a hash table 1221 transmitted from a database 1230 to obtain contents IDs and frame indexes for hash data and distribute and illustrate the obtained contents IDs and the frame indexes on an ID-frame plane (will be described later)

The hash table 1221 transmitted from the database 1230 includes information about which fingerprint is extracted from which time frame of which contents, in addition to a hash code corresponding to a reference value. Accordingly, a contents ID corresponding to the hash data to which a query is transmitted and a frame number may be obtained by mapping the hash data to which the query is transmitted and a database using a hash table.

The simplest method for contents matching is to directly compare the hash code to which the query is transmitted with a hash reference value of the database in (bit) string units, but this method is very inefficient.

Since an audio fingerprint and the hash code based on a spectral shape feature have robust features with respect to time variation, efficient matching may be performed using such a feature. If a distribution of hash codes in which a matching query is transmitted to a database domain (ID-frame domain) is illustrated, the distribution is concentrated on a predetermined location on the database domain due to such a feature (will be described later).

A lookup table mapping function L and a query distribution diagram H for illustrating a database domain distribution corresponding to fingerprint information to which the matching query is transmitted are defined as shown in [Equation 2] below.

$$(n_{ID}, n_{Fr})_j = L\{fp_{query}(j)\} \rightarrow H\{(n_{ID}, n_{Fr})_j\} = 1 \quad \text{[Equation 2]}$$

At this time, the lookup table mapping function L is a function for mapping a fingerprint $fp_{query}(j)\}$ to which a matching query is transmitted to a predetermined value $(n_{ID}, n_{Fr})_j$ using a lookup table, and the query distribution diagram H for the query is set to 1 after mapping.

When candidate contents IDs and frame indexes for the hash data are determined (1122), a frame concentration measure (FCM) of each candidate contents ID is calculated (1123).

At this time, a FCM $FCM(n_{ID})$ for n_ID is defined as shown in [Equation 3].

$$FCM(n_{ID}) = \text{argmax} \sum_{n_{Fr}}^{n_{Fr}+N_{Fr}} H(n_{ID}, n_{Fr})$$

In this case, N_Fr denotes the total number of all frames, and Q denotes a sigma function (Σ).

That is, the FCM is defined as the sum of distribution values corresponding to N_Fr matching queries. As the concentration of a frame concentrated on each candidate ID is higher, a likelihood of coincidence with the corresponding contents is higher, and thus similarity may be determined based on the probability Also, if the distribution of the fingerprint information to which the matching query is transmitted is displayed in the database domain, it may be confirmed that the distribution is concentrated on an ID and a frame number having the highest similarity (will be described later).

If the FCM of the candidate IDs is calculated, the calculated FCM is compared with a predetermined threshold value α (1124). If the FCM of all the candidate IDs does not exceed the threshold value α, the matcher 1120 transmits a matching failure result and a query retransmission request to the fingerprint extracting unit 1110.

If there is an ID whose FCM exceeds the threshold value α among the candidate IDs, a hash value of a region where matching is concentrated is compared with a hash value in the database to select an optimal ID (1125), and the corresponding contents ID and related metadata are output as a matching result. For example, a Hamming distance between the hash code to which the matching query is transmitted and the hash code in the database may be calculated, and a contents ID having the smallest result value may be determined as an optimal ID.

Figure 12:
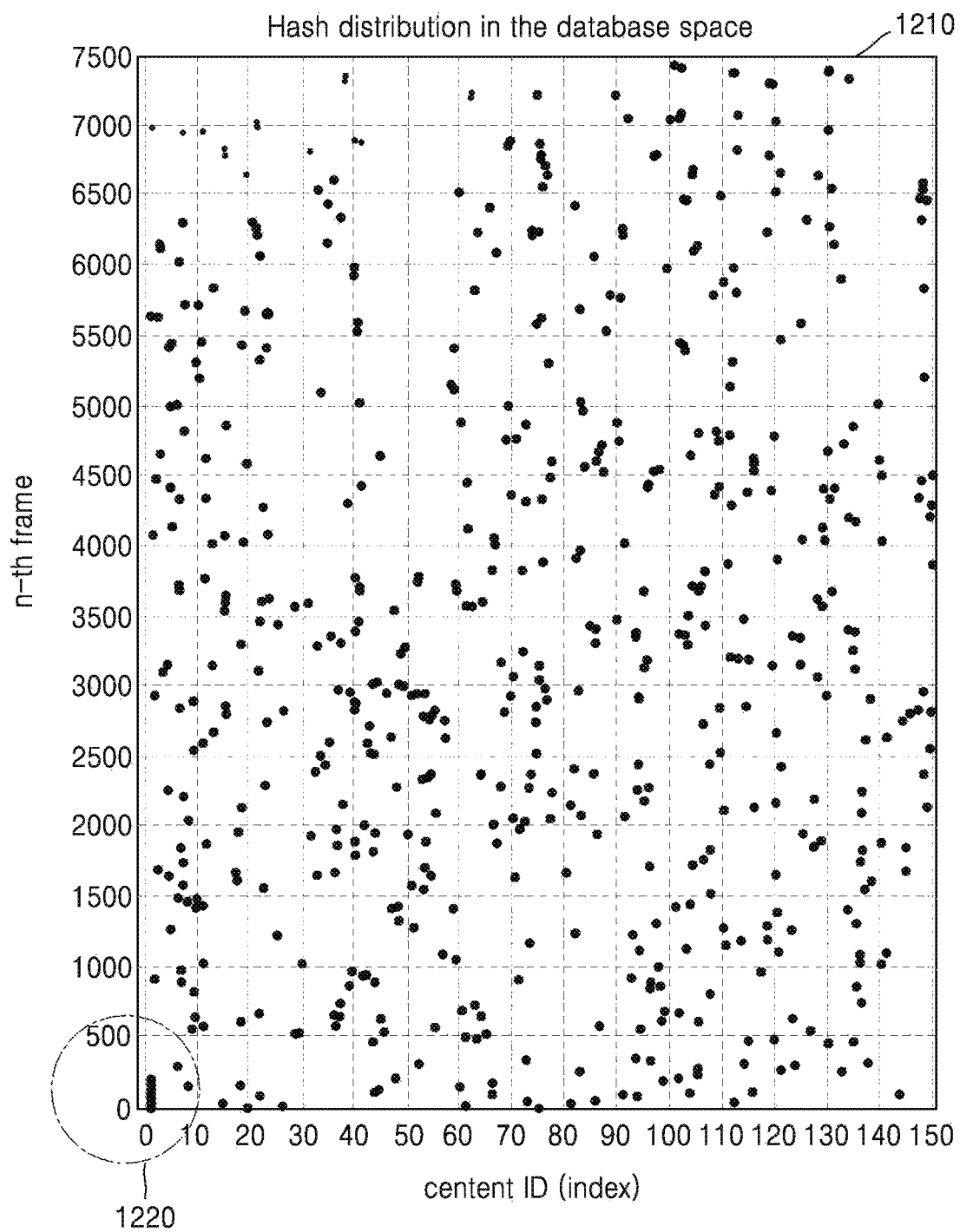
FIG. 12 is a diagram showing an embodiment in which fingerprint information distribution, in which a matching query is transmitted, is displayed in a database domain.

FIG. 12 is a diagram showing an embodiment in which a fingerprint information distribution in which a matching query is transmitted is displayed on a database domain.

As described above, if the fingerprint information distribution in which the matching query is transmitted is displayed on the database domain, the distribution is concentrated on an ID and a frame number having the highest similarity. In the embodiment shown in FIG. 12, there is a region 1220 in which matching is concentrated around (n_ID, n_FR)=(1, 1) as a result of displaying the fingerprint information distribution in which the matching query is transmitted on the database domain.

That is, in this case, the matching result is (n_ID, n_FR)=(1,1), and a matcher obtains a result that an audio fingerprint to which the matching query is transmitted corresponds to a first frame of first contents.

Figure 13A:
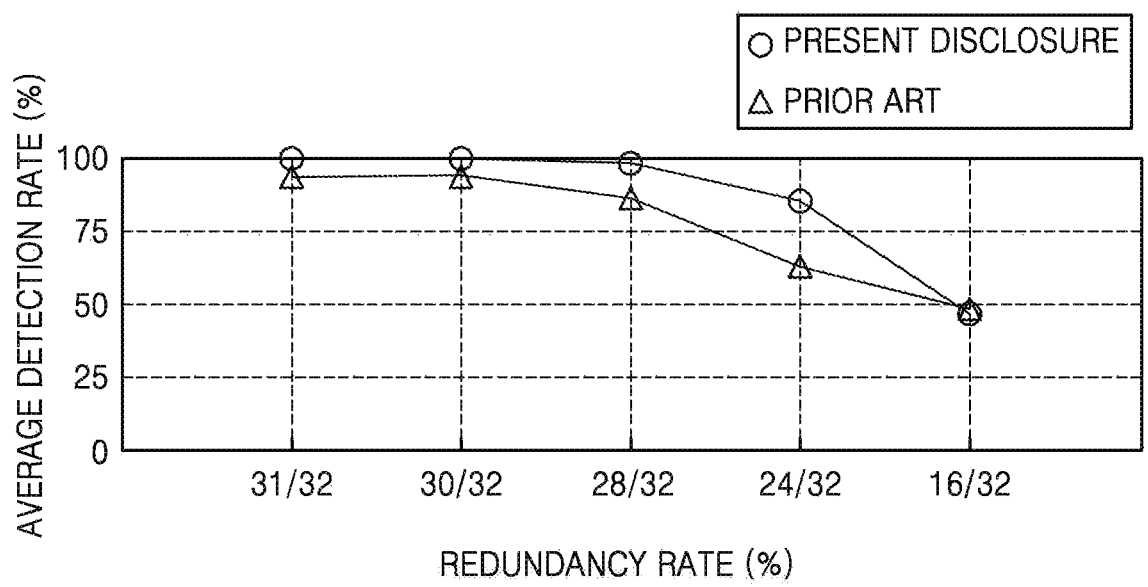
FIGS. 13A and 13B are diagrams illustrating performance of a contents recognition method according to an embodiment of the present disclosure.
Figure 13B:
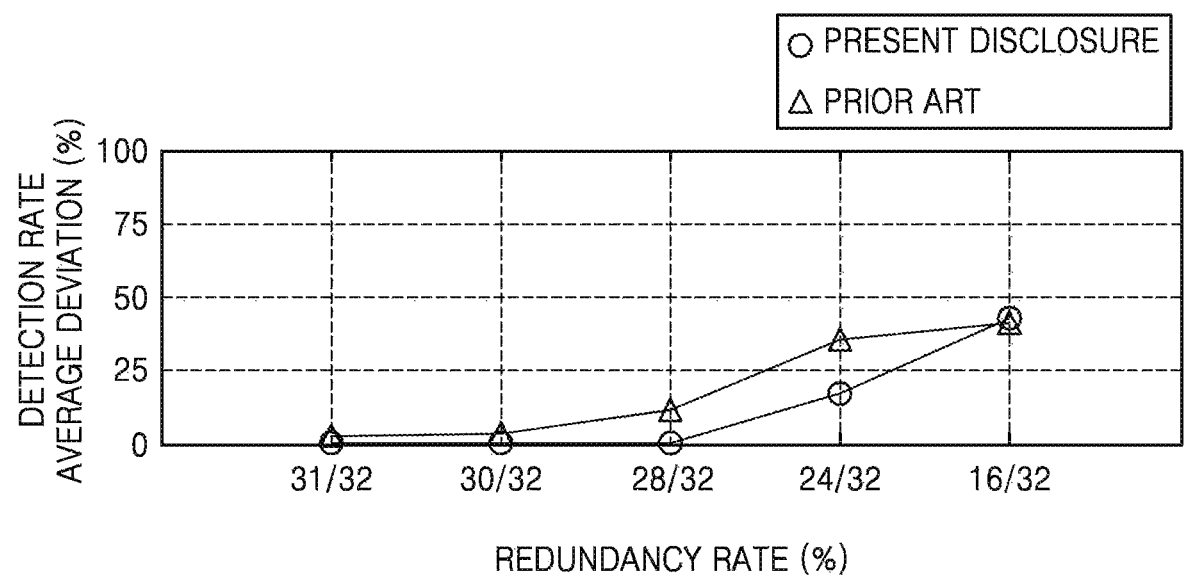

FIGS. 13A and 13B are diagrams illustrating performance of a contents recognition method according to an embodiment of the present disclosure.

Although there are various methods for determining the performance of the contents recognition method, in the embodiment shown in FIG. 13, the performance is determined in relation to contents recognition, that is, a retransmission rate due to a matching failure.

FIG. 13A shows an average detection rate for each redundancy ratio in a frame length of 2048 and a sampling rate of 16 kHz. Also, FIG. 13B shows a detection rate standard deviation for each redundancy ratio in a frame length of 2048 and a sampling rate of 16 kHz.

Since the detection rate indicates a rate of successful contents recognition, it may be determined that the higher the detection rate is, the higher the contents recognition performance is, and the smaller the standard deviation of the detection rate is, the more stable the contents recognition performance is.

Referring to FIG. 13A, a contents recognition result according to the present disclosure shows a high detection rate as compared with a contents recognition result according to the prior art. Referring to FIG. 13B, the contents recognition result according to the present disclosure shows a low standard deviation as compared with the contents recognition result according to the prior art. Therefore, it may be seen that the contents recognition method according to the present disclosure shows better performance and operates more stably than the prior art.

Figure 14:
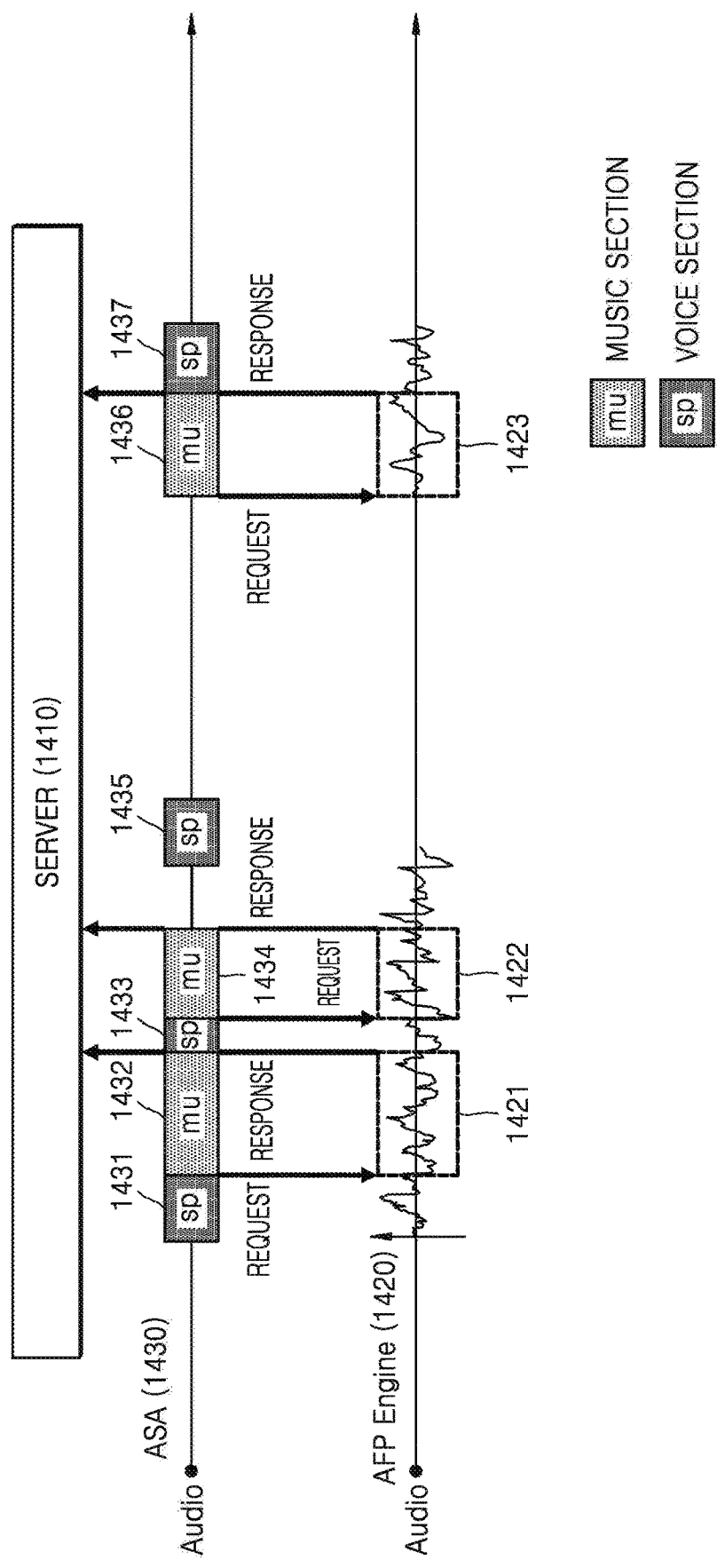
FIG. 14 is a diagram illustrating an operation flow according to an operation scenario of a contents recognition method according to an embodiment of the present disclosure.

FIG. 14 is a diagram illustrating an operation flow according to an operation scenario of a contents recognition method according to an embodiment of the present disclosure.

According to an embodiment of the present disclosure, an audio scene analysis (ASA) for a music or voice section is performed on audio contents in which various kinds of sound sources exist, and contents recognition may be performed only on a predetermined sound source or a sound source desired by a user.

In the embodiment shown in FIG. 14, contents recognition is performed only on the music section. A sound source analysis 1430 is performed on a sound source in which a music section mu and a sound section sp exist using speech/music detection (SMD) to determine the music section and the voice section.

For example, if music sections 1432, 1434, and 1436 are detected while a predetermined sound source is being reproduced via streaming, a fingerprint extraction or an audio contents recognition request is transmitted to an audio fingerprint engine 1420. When the fingerprint extraction or the audio contents recognition request is received, the audio fingerprint engine 1420 extracts an audio fingerprint from received audio data and generates a hash code while waiting for a corresponding music section to end.

If the musical section ends, the audio fingerprint engine 1420 transmits a matching query to a matching server 1410 in response to the fingerprint extraction or contents recognition request. The matching server 1410 performs matching and contents recognition based on fingerprint information such as a hash table transmitted from a database (not shown).

Figure 15:
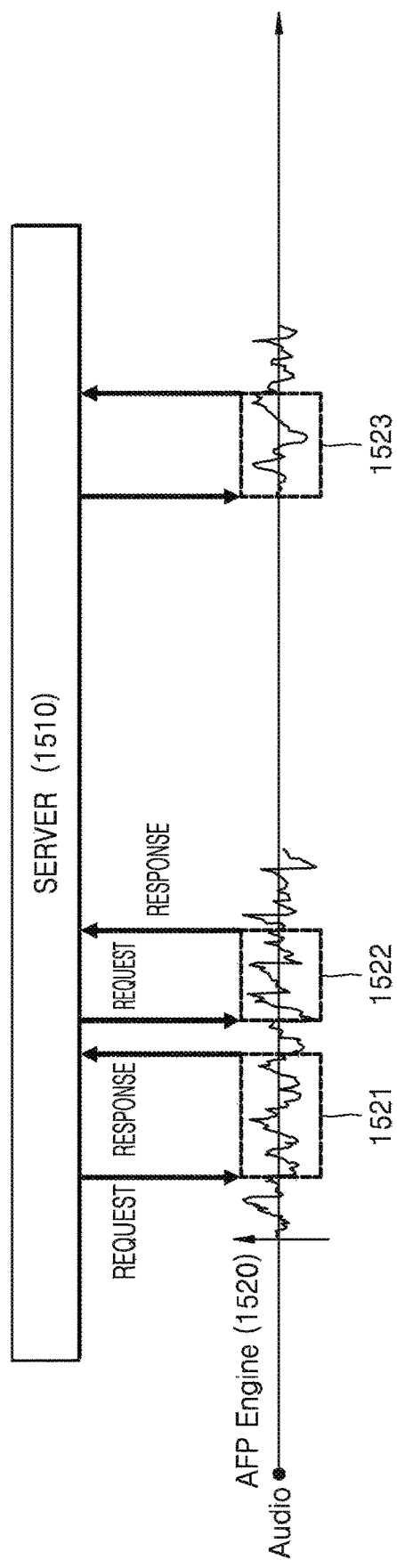
FIG. 15 is a diagram illustrating an operation flow according to an operation scenario of a contents recognition method according to another embodiment of the present disclosure.

FIG. 15 is a diagram illustrating an operation flow according to an operation scenario of a contents recognition method according to another embodiment of the present disclosure.

According to an embodiment of the present disclosure, when there is a request of a server, the server may operate to perform contents recognition. For example, when a server 1510 needs information about contents being reproduced on a client, the server 1510 transmits a fingerprint extraction or audio contents recognition request command to an audio fingerprint engine 1520 of the client.

When the fingerprint extraction request command is received from the server 1510, the audio fingerprint engine 1520 extracts an audio fingerprint from audio data for a predetermined time or until a fingerprint extraction or audio contents recognition end command is received, and generates a hash code.

When the predetermined time elapses or the end command is received, the audio fingerprint engine 1520 transmits a matching query to the server 1510. The matching server 1510 performs matching and contents recognition based on the fingerprint information such as the hash table transmitted from a database (not shown).

According to the above embodiment, when video contents recognition and audio contents recognition operate in series in a video-audio hybrid type multimedia contents recognition apparatus, it is advantageous that the video-audio hybrid type multimedia contents recognition apparatus may efficiently control each operation.

Figure 16:
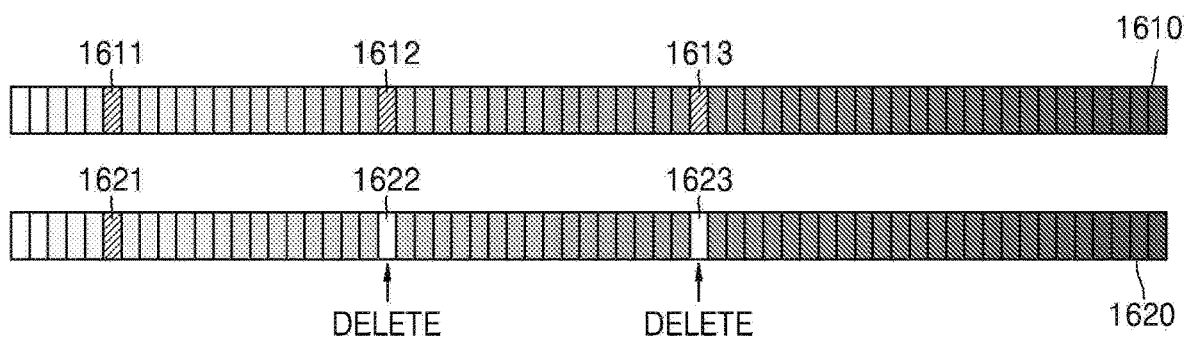
FIG. 16 illustrates an audio fingerprint sequence for describing a contents recognition method according to another embodiment of the present disclosure.

FIG. 16 illustrates an audio fingerprint sequence for describing a contents recognition method according to another embodiment of the present disclosure.

An audio fingerprint sequence 1610 shown in FIG. 16 has the same fingerprint values 1611, 1612, and 1613 at a plurality of positions. Thus, fingerprints having the same value are factors that waste system resources while not having valid information. Accordingly, a fingerprint sequence may be newly generated (1620) by deleting fingerprints excluding one of the fingerprints having the same value (1622, 1623).

When a matching query based on a regenerated fingerprint sequence is transmitted to a server as described above, it is advantageous that matching performance may be maintained at the same level while an amount of queries is reduced.

FIGS. 17 to 20 are diagrams for explaining a method of recognizing contents on data having a short signal length or non-continuous data.

In the data having the short signal length or the non-continuous data, since it is difficult to find signal synchronization, it makes an asynchronous environment in which it is difficult to measure an accurate time delay.

Figure 17:
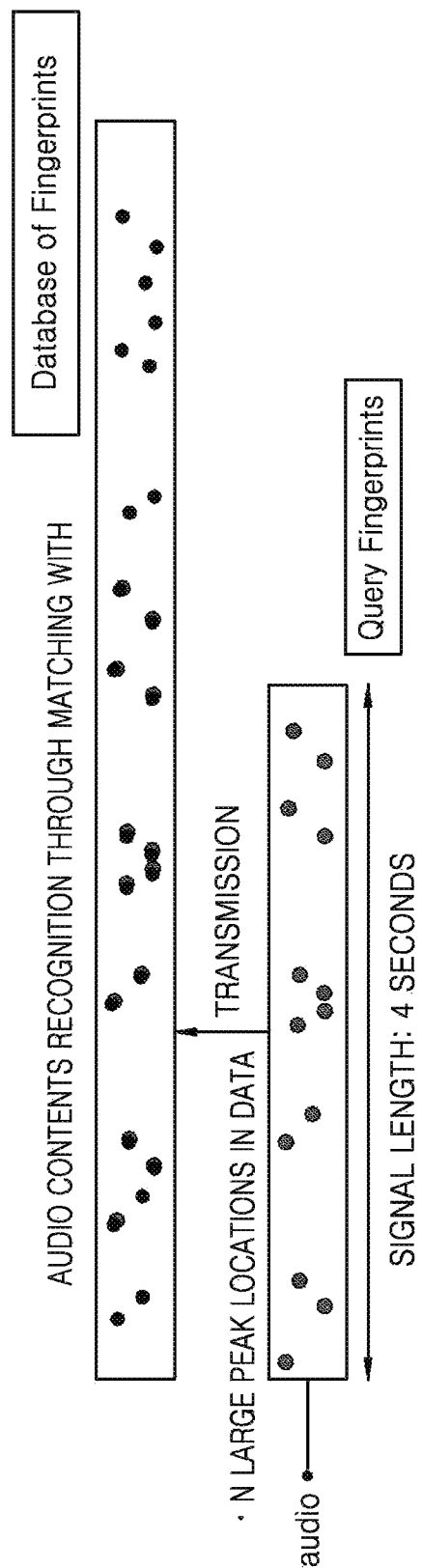
FIG. 17 is a diagram for explaining a method of matching an audio fingerprint extracted by the prior art and a database audio fingerprint.

FIG. 17 is a diagram for explaining a method of matching an audio fingerprint extracted by the prior art and a database audio fingerprint.

In the prior art, in the asynchronous environment, since contents recognition performance is significantly lowered, the audio fingerprint is extracted using audio data for a long time of about 4 seconds to obtain sufficient information. When a sufficiently long time of data is used, a plurality of large peaks are present in a section, and such a peak is a good audio fingerprint feature point, and at the same time, includes information used to obtain synchronization of a signal.

Figure 18:
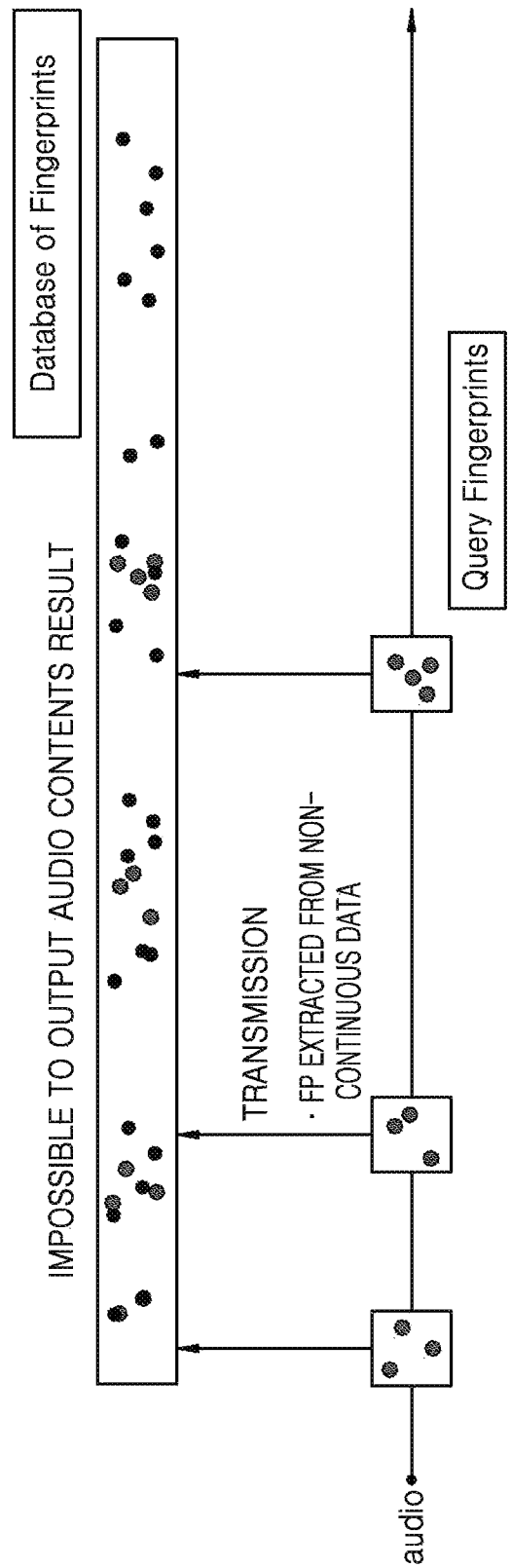
FIG. 18 is a diagram showing an audio fingerprint extracted by the prior art and a database audio fingerprint when the non-continuous data is received.

FIG. 18 is a view showing an audio fingerprint extracted by the prior art and a database audio fingerprint when the non-continuous data is received.

The prior art method has a problem that an audio fingerprint extracted from a non-continuous signal does not include sufficient information for synchronization and may not be matched with the database audio fingerprint.

Figure 19:
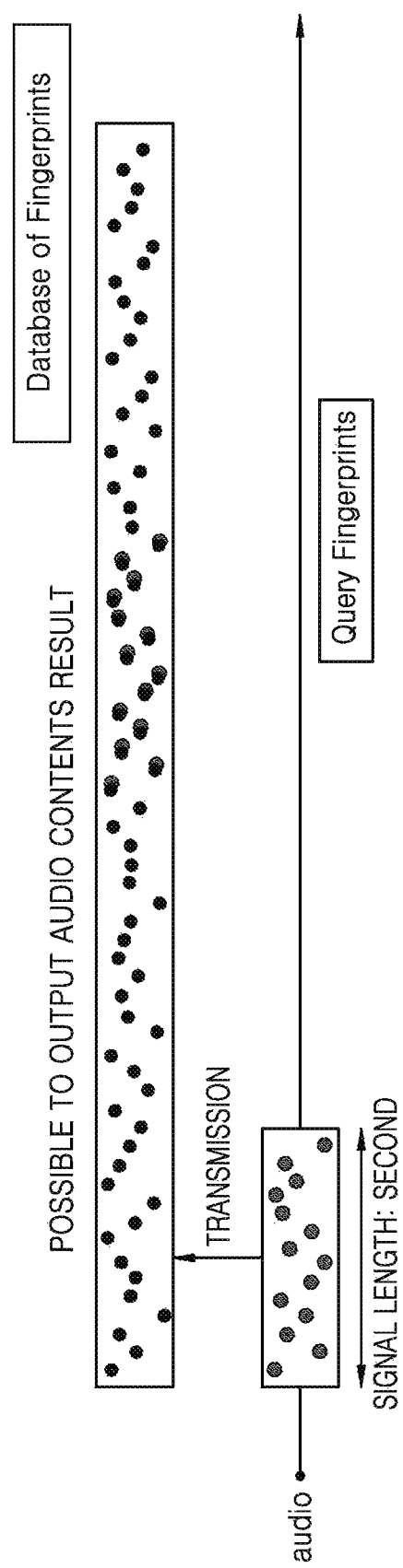
FIG. 19 is a diagram showing an audio fingerprint extracted from a spectral shape and an audio fingerprint of a database, according to an embodiment of the present disclosure, when the data having the short signal length is received.

FIG. 19 is a diagram showing an audio fingerprint extracted from a spectral shape and an audio fingerprint of a database according to an embodiment of the present disclosure when the data having the short signal length is received.

Figure 20:
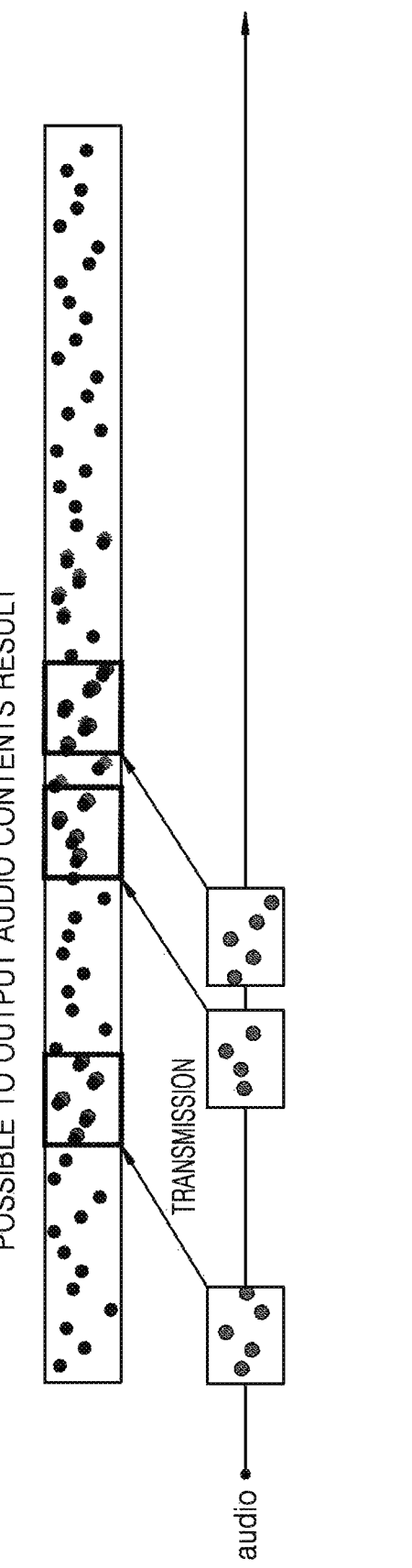
FIG. 20 is a diagram showing an audio fingerprint extracted from a spectral shape and an audio fingerprint of a database, according to an embodiment of the present disclosure, when the non-continuous data is received.

FIG. 20 is a diagram showing an audio fingerprint extracted from a spectral shape and an audio fingerprint of a database according to an embodiment of the present disclosure when the non-continuous data is received.

In the asynchronous environment shown in FIG. 19 or FIG. 20, since a deterioration phenomenon occurs according to the prior art, it is impossible to recognize contents or a contents recognition rate is significantly lowered. However, according to a fingerprint extraction method and a hash code generation method according to the present disclosure, it is possible to generate continuous fingerprints even with a short signal and has a feature that is robust to asynchronization, which makes it possible to perform contents recognition on an non-periodic signal or an input signal having a short time.

Also, a plurality of non-continuous queries may be transmitted over a short time by combining two methods, and thus it is possible to further improve contents recognition performance and expand to various scenarios.

Figure 21:
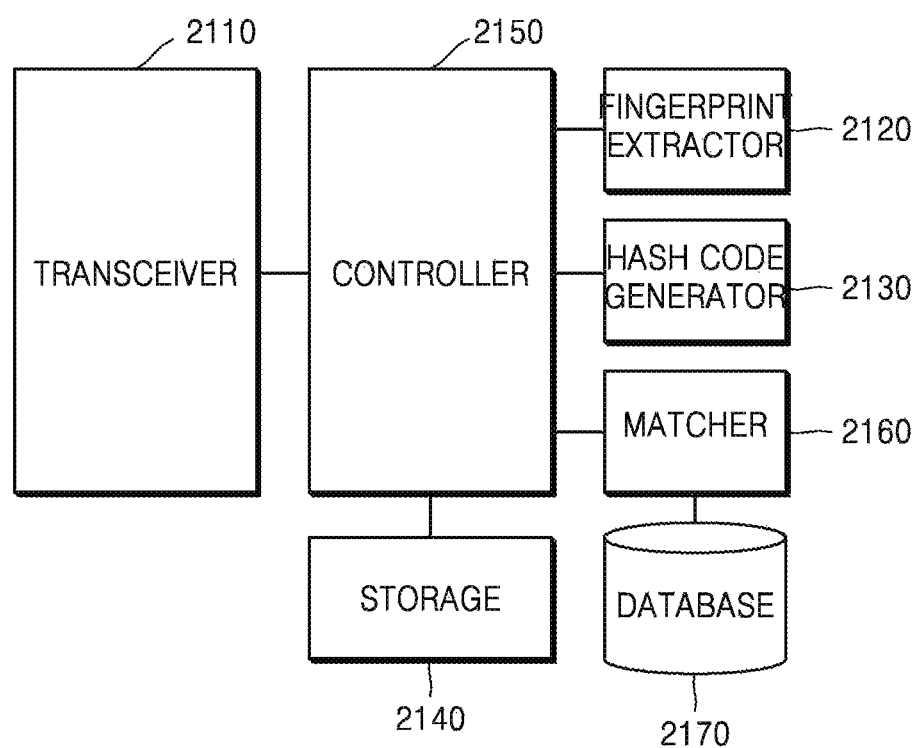
FIG. 21 is a block diagram of an audio contents recognition device according to another embodiment of the present disclosure.

FIG. 21 is a block diagram of an audio contents recognition device according to another embodiment of the present disclosure.

The audio contents recognition device shown in FIG. 21 further includes a matcher 2160 and a database 2170 as compared with the audio contents recognition device shown in FIG. 3, and thus only these will be described.

In the database 2170, fingerprint information for all audio contents, a hash table, and additional information are stored. When a fingerprint information or hash table transfer request is received from the matcher 2160, the database 2170 transmits the information to the matcher 2160.

The matcher 2160 performs matching based on a hash code transmitted from a hash code generator 2130 and the hash table transmitted from the database 2170, and obtains contents IDs, frame numbers, the additional information, and the like as a matching result.

Figure 22:
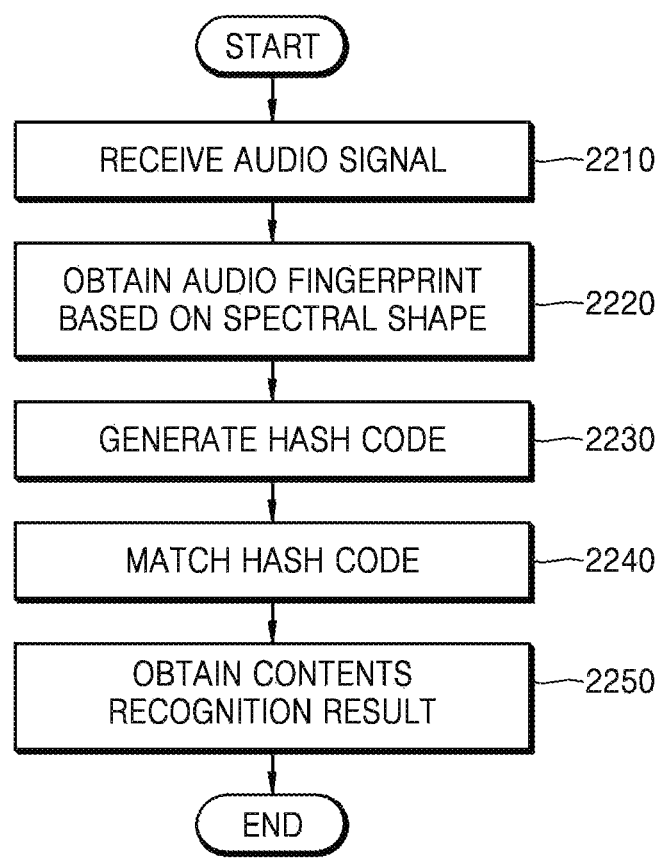
FIG. 22 is a flowchart illustrating an operation of an audio contents recognition device according to another embodiment of the present disclosure.

FIG. 22 is a flowchart illustrating an operation of an audio contents recognition device according to another embodiment of the present disclosure.

In the embodiment shown in FIG. 22, a matching operation is performed directly by the audio contents recognition device. Therefore, transmitting a matching query and receiving a contents recognition result are excluded in comparison with FIG. 4, and matching hash codes (2240) and acquiring a contents recognition result (2250) are added.

The above-described embodiments of the present disclosure may be implemented as programmable instructions executable by a variety of computer components and stored in a non-transitory computer readable recording medium. The non-transitory computer readable recording medium may include program instructions, a data file, a data structure, or any combination thereof. The program instructions stored in the non-transitory computer readable recording medium may be designed and configured specifically for the present disclosure or may be publicly known and available to those of ordinary skill in the field of software. Examples of the non-transitory computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, a ROM, a RAM, a flash memory, and the like. Examples of the program instructions include machine codes made by, for example, a compiler, as well as high-level language codes executable by a computer using an interpreter. The above exemplary hardware device may be configured to operate as one or more software modules in order to perform the operation in an exemplary embodiment, and vice versa.

While the present disclosure has been particularly shown and described with reference to exemplary embodiments thereof, it is to be understood that the invention is not limited to the disclosed embodiments, but, on the contrary, those skilled in the art will appreciate that various modifications, additions and substitutions may be made without departing from the scope and spirit of the invention as disclosed in the accompanying claims.

Accordingly, the spirit of the present disclosure should not be construed as being limited to the above-described embodiments, and all ranges equivalent to or equivalently modified from the claims of the present disclosure belongs to the technical spirit of the present disclosure.

The invention claimed is:

1. An audio contents recognition method comprising:
   receiving an audio signal;
   obtaining audio fingerprints (AFPs) based on a spectral shape of the received audio signal;
   generating hash codes for the obtained audio fingerprints;
   transmitting a matching query about a match between the generated hash codes and hash codes stored in a database; and
   receiving a contents recognition result of the audio signal in response to the transmitting,
   wherein the generating of the hash codes comprises determining a frame interval of the obtained audio fingerprints based on a discrete cosine transform (DCT) coefficient difference change of reference frames among a plurality of frames of the obtained audio fingerprints and generating the hash codes for the obtained audio fingerprints based on the determined frame interval.

2. The audio contents recognition method of claim 1, wherein the audio fingerprints are determined based on a frequency domain spectral shape of the received audio signal.

3. The audio contents recognition method of claim 2, wherein the frame interval is generated based on a spectral size difference between adjacent frames of the obtained audio fingerprints.

4. The audio contents recognition method of claim 1, wherein the generating of the hash codes comprises applying a weight determined based on frequency domain energy of the obtained audio fingerprints.

5. The audio contents recognition method of claim 1, wherein the transmitting of the matching query comprises determining hash codes to transmit a matching query and a transmission priority of the hash codes to transmit the matching query among the generated hash codes based on a number of bit variations between hash codes corresponding to frames adjacent to each other.

6. The audio contents recognition method of claim 1, wherein the contents recognition result is determined based on contents identifications (IDs) of the hash codes that transmitted the matching query and a frame concentration measure (FCM) of a frame domain.

7. The audio contents recognition method of claim 1, wherein the audio signal comprises at least one of channel audio and object audio.

8. The audio contents recognition method of claim 1, further comprising:
  analyzing an audio scene feature of the received audio signal; and
  setting a section to obtain an audio fingerprint based on the audio scene feature,
  wherein the obtaining of the audio fingerprints comprises obtaining an audio fingerprint for the section.

9. The audio contents recognition method of claim 1, further comprising:
  receiving an audio contents recognition command and a matching query transmission command,
  wherein the obtaining of the audio fingerprints comprises obtaining an audio fingerprint for a section from a time when the audio contents recognition command is received to a time when the matching query transmission command is received.

10. The audio contents recognition method of claim 1, wherein the generating of the hash codes comprises, if audio fingerprints having the same value are present among the obtained audio fingerprints, deleting the audio fingerprints having the same value except for one.

11. An audio contents recognition method comprising:
  receiving an audio signal;
  obtaining audio fingerprints (AFPs) of the received audio signal;
  generating hash codes for the obtained audio fingerprints;
  matching the generated hash codes and hash codes stored in a database; and
  recognizing contents of the audio signal based on a result of the matching,
  wherein the generating of the hash codes comprises determining a frame interval of the obtained audio fingerprints based on a discrete cosine transform (DCT) coefficient difference change of reference frames among a plurality of frames of the obtained audio fingerprints and generating the hash codes for the obtained audio fingerprints based on the determined frame interval.

12. An audio contents recognition device comprising:
  a transceiver configured to receive an audio signal;
  a processor; and
  a memory storing instructions executable by the processor,
  wherein the processor is configured to:
  obtain audio fingerprints (AFPs) of the received audio signal,
  generate hash codes for the obtained audio fingerprints,
  transmit a matching query about a match between the generated hash codes and hash codes stored in a database, and receive a contents recognition result of the audio signal in response to the transmitting,
  wherein the processor is further configured to determine a frame interval of the obtained audio fingerprints based on a discrete cosine transform (DCT) coefficient difference change of reference frames among a plurality of frames of the obtained audio fingerprints and to generate the hash codes for the obtained audio fingerprints based on the determined frame interval.

13. An audio contents recognition device comprising:
  a transceiver configured to receive an audio signal;
  a processor; and
  a memory storing instructions executable by the processor,
  wherein the processor is configured to:
  obtain audio fingerprints (AFPs) of the received audio signal,
  generate hash codes for the obtained audio fingerprints, and
  match the generated hash codes and hash codes stored in a database and recognize contents of the audio signal based on a result of the matching,
  wherein the processor is further configured to determine a frame interval of the obtained audio fingerprints based on a discrete cosine transform (DCT) coefficient difference change of reference frames among a plurality of frames of the obtained audio fingerprints and to generate the hash codes for the obtained audio fingerprints based on the determined frame interval.

14. A computer-readable recording medium having recorded thereon a computer program for implementing the method of claim 1.

* * * * *